US010027506B2

(12) United States Patent
Zhong

(10) Patent No.: US 10,027,506 B2
(45) Date of Patent: Jul. 17, 2018

(54) TRANSMISSION APPARATUS, CONNECTION DEVICE, AND METHOD SO THAT MULTIPLE ETHERNET MAC PORTS CAN BE SIMULTANEOUSLY SUPPORTED

(71) Applicant: HUAWEI TECHNOLOGIES CO., LTD., Shenzhen (CN)

(72) Inventor: Qiwen Zhong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 303 days.

(21) Appl. No.: 14/855,530

(22) Filed: Sep. 16, 2015

(65) Prior Publication Data

US 2016/0006578 A1    Jan. 7, 2016

Related U.S. Application Data

(63) Continuation of application No. PCT/CN2013/072979, filed on Mar. 21, 2013.

(51) Int. Cl.
*H04L 12/403* (2006.01)
*H04L 12/931* (2013.01)
(Continued)

(52) U.S. Cl.
CPC .......... *H04L 12/403* (2013.01); *H04J 3/1694* (2013.01); *H04L 49/15* (2013.01);
(Continued)

(58) Field of Classification Search
None
See application file for complete search history.

(56) References Cited

U.S. PATENT DOCUMENTS 7,103,008 B2 *   9/2006   Greenblat ............... G06F 15/78
                                                     370/229
7,283,551 B1 *  10/2007   Algie ..................... H04J 3/1682
                                                     370/442

(Continued)

FOREIGN PATENT DOCUMENTS

CN          1946086 A        4/2007
CN        101163148 A        4/2008
(Continued)

OTHER PUBLICATIONS

Chinese Search Report dated Jan. 12, 2016 in corresponding Chinese Patent Application No. 201380000468.4.
(Continued)

*Primary Examiner* — Donald Mills
(74) *Attorney, Agent, or Firm* — Staas & Halsey LLP

(57) ABSTRACT

Embodiments of the present invention provide a transmission apparatus, a connection device, and a method, where the apparatus includes N Ethernet Medium Access Control MAC ports, where each Ethernet MAC port is corresponding to a first MII interface, K Ethernet physical layer interfaces, where each Ethernet physical layer interface is corresponding to a second MII interface, and a connection device, where both N and K are positive integers; where the connection device is configured to control a time-division interconnect bus in the connection device or a time-division space-division switching matrix in the connection device to implement a connection between a timeslot of the first MII interface and a timeslot of the second MII interface, where the N Ethernet MAC ports and the K Ethernet physical layer interfaces are separately connected to the connection device by using the first MII interfaces and the second MII interfaces.

19 Claims, 15 Drawing Sheets

(51) Int. Cl.
*H04J 3/16* (2006.01)
*H04L 12/933* (2013.01)
*H04Q 11/06* (2006.01)

(52) U.S. Cl.
CPC .......... *H04L 49/351* (2013.01); *H04Q 11/06* (2013.01); *H04Q 2213/13389* (2013.01)

(56) References Cited

U.S. PATENT DOCUMENTS

| | | | | |
|---|---|---|---|---|
| 7,372,875 | B2* | 5/2008 | Hadzic | H03L 7/085 370/516 |
| 7,385,995 | B2* | 6/2008 | Stiscia | H04J 3/1682 370/412 |
| 8,027,473 | B2* | 9/2011 | Stiscia | H04L 63/0428 370/397 |
| 2002/0035656 | A1* | 3/2002 | Tate | H04L 25/05 710/66 |
| 2003/0046706 | A1* | 3/2003 | Rakib | H04L 45/10 725/111 |
| 2003/0214979 | A1* | 11/2003 | Kang | H04J 3/047 370/535 |
| 2004/0202170 | A1 | 10/2004 | Parchak et al. | |
| 2004/0264961 | A1* | 12/2004 | Nam | H04Q 11/0067 398/58 |
| 2009/0109966 | A1 | 4/2009 | Yu et al. | |
| 2011/0310905 | A1 | 12/2011 | Yu | |
| 2012/0307637 | A1 | 12/2012 | Diab | |
| 2012/0328289 | A1 | 12/2012 | Julien et al. | |
| 2013/0077499 | A1* | 3/2013 | Schmitz | H04J 3/0688 370/249 |

FOREIGN PATENT DOCUMENTS

| | | |
|---|---|---|
| CN | 101437035 A | 5/2009 |
| CN | 101442563 | 5/2009 |
| CN | 102082679 | 6/2011 |
| CN | 102215147 A | 10/2011 |
| EP | 2378742 | 10/2011 |

OTHER PUBLICATIONS

Chinese Office Action dated Jan. 27, 2016 in corresponding Chinese Patent Application No. 201380000468.4.
Extended European Search Report dated Jan. 25, 2016 in corresponding European Patent Application No. 13879210.6.
"Matrix Switch with STM-1/OC-3 and Gigabit Ethernet Model 6511, ForeFront AIS", Patton, pp. 1-2.
International Search Report dated Jan. 2, 2014, in corresponding International Application No. PCT/CN2013/072979.
PCT International Search Report dated Jan. 2, 2014 in corresponding International Patent Application No. PCT/CN2013/072979.
D.L. Mills, "Internet Time Synchronization: the Network Time Protocol", Network Working Group, Oct. 1989, pp. 1-27 with two cover pages.

* cited by examiner

TRANSMISSION APPARATUS, CONNECTION DEVICE, AND METHOD SO THAT MULTIPLE ETHERNET MAC PORTS CAN BE SIMULTANEOUSLY SUPPORTED

CROSS-REFERENCE TO RELATED APPLICATIONS

This application is a continuation of International Application No. PCT/CN2013/072979, filed on Mar. 21, 2013, which is hereby incorporated by reference in its entirety.

TECHNICAL FIELD

Embodiments of the present invention relate to the field of communications technologies, and more specifically, relate to a transmission apparatus, a connection device, and a method.

BACKGROUND

In the Ethernet technology, a MAC (Medium Access Control, Medium Access Control) layer is located at a data link layer; and sublayers such as PCS (Physical Coding Sublayer, physical coding sublayer), FEC (Forward Error Correction, forward error correction), PMA (Physical Medium Attachment, physical medium attachment), and PMD (Physical Medium Dependent, physical medium dependent) are located at a physical layer. Interconnection between the data link layer and the physical layer is implemented by an MII (Media Independent Interface, media independent interface) electrical interface. One Mac address identifies one Ethernet port, and one MAC port is connected to one physical layer interface by using a corresponding MII.

To meet an increasing demand on a network data traffic speed, a rate of a MAC port continuously increases. The rate of a MAC port rate increases by tenfold. For example, the rate of a MAC port (the rate of a MAC port is determined by bandwidth of a physical layer interface) continuously evolves from 10 Mbps to 100 Mbps, 1 Gbps, 10 Gbps, and 100 Gbps, and from 40 Gbps to 400 Gbps. One MAC port is connected only to one physical layer interface, and the rate of a MAC port generally increases by tenfold, but bandwidth required in actual application does not necessarily increase by tenfold; therefore, a transmission apparatus in the prior art has relatively great limitations. For example, efficient support for an Ethernet MAC port with a rate of 50 Gbps, 60 Gbps, 150 Gbps, and so on is insufficient, which further causes low utilization of interface bandwidth when there is a relatively great difference between bandwidth required in actual application and bandwidth of a physical layer interface. For example, if a 100GE physical interface module is used to support a MAC port with a rate of 50 Gbp, 50% of capacity of the 100GE physical interface module is wasted.

SUMMARY

Embodiments of the present invention provide a transmission apparatus, a connection device, and a method, so that multiple Ethernet MAC ports can be simultaneously supported, an Ethernet MAC port with adjustable bandwidth is provided, so as to increase flexibility of the transmission apparatus.

According to a first aspect, a transmission apparatus is provided, where the apparatus includes N Ethernet Medium Access Control MAC ports, where each Ethernet MAC port is corresponding to a first MII interface, K Ethernet physical layer interfaces, where each Ethernet physical layer interface is corresponding to a second MII interface, and a connection device, where both N and K are positive integers; where the connection device is configured to control a time-division interconnect bus in the connection device or a time-division space-division switching matrix in the connection device to implement a connection between a timeslot of the first MII interface and a timeslot of a second MII interface, where the N Ethernet MAC ports are separately connected to the time-division interconnect bus in the connection device by using the corresponding first MII interfaces, and the K Ethernet physical layer interfaces are separately connected to the time-division interconnect bus in the connection device by using the corresponding second MII interfaces; or, the N Ethernet MAC ports are separately connected to the time-division space-division switching matrix in the connection device by using the corresponding first MII interfaces, and the K Ethernet physical layer interfaces are separately connected to the time-division space-division switching matrix in the connection device by using the corresponding second MII interfaces.

With reference to the first aspect, in a first possible implementation manner, the connection device is further configured to configure and control timeslot division, and allocate some or all timeslots of P timeslots obtained by means of division to some or all ports of the N Ethernet MAC ports, where P is a positive integer.

With reference to the first possible implementation manner of the first aspect, in a second possible implementation manner, one interface of the K Ethernet physical layer interfaces has J virtual channels, or multiple interfaces of the K Ethernet physical layer interfaces have J virtual channels altogether; and the connection device is further configured to map some or all timeslots of the P timeslots to the J virtual channels, where each virtual channel is used to provide bandwidth by using the second MII interface, and J is a positive integer.

With reference to the first possible implementation manner or the second possible implementation manner of the first aspect, in a third possible implementation manner, the connection device is further configured to mark some or all timeslots of the P timeslots.

With reference to any manner of the first possible implementation manner to the third possible implementation manner of the first aspect, in a fourth possible implementation manner, the connection device is further configured to extend a bit width or increase a clock rate for any MAC port of the N Ethernet MAC ports, so that a MAC port capacity with transmission capabilities of multiple physical interfaces is supported.

With reference to the first aspect or any manner of the first possible implementation manner to the fourth possible implementation manner of the first aspect, in a fifth possible implementation manner, the connection device is further configured to implement data transmission between N1 Ethernet MAC ports and K1 Ethernet physical layer interfaces by using the connection between the timeslot of the first MII interface and the timeslot of the second MII interface, where the N Ethernet MAC ports include the N1 Ethernet MAC ports, where N1 is a positive integer and N1≤N; and the K Ethernet physical layer interfaces include the K1 Ethernet physical layer interfaces, where K1 is a positive integer and K1≤K.

With reference to the fifth possible implementation manner of the first aspect, in a sixth possible implementation manner, the connection device is further configured to implement uplink data transmission in a direction from the K1 Ethernet physical layer interfaces to the N1 Ethernet MAC ports by using the connection between the timeslot of the first MII interface and the timeslot of the second MII interface; or, the connection device is further configured to implement downlink data transmission in a direction from the N1 Ethernet MAC ports to the K1 Ethernet physical layer interfaces by using the connection between the timeslot of the first MII interface and the timeslot of the second MII interface.

With reference to the sixth possible implementation manner of the first aspect, in a seventh possible implementation manner, the connection device is further configured to control the time-division interconnect bus or the time-division space-division switching matrix to converge the downlink data borne in the timeslots of the first MII interfaces, so that the converged downlink data is borne in the timeslot of the second MII interface by using the connection between the timeslot of the first MII interface and the timeslot of the second MII interface, and the converged downlink data borne in the timeslot of the second MII interface is sent to the K1 Ethernet physical layer interfaces; and the K1 Ethernet physical layer interfaces are configured to encode the converged downlink data and transmit encoded downlink data to a physical transmission channel.

With reference to the sixth possible implementation manner of the first aspect, in an eighth possible implementation manner, the K1 Ethernet physical layer interfaces are configured to receive encoded uplink data from a physical transmission channel, decode the encoded uplink data, and send decoded uplink data to the connection device; and the connection device is further configured to control the time-division interconnect bus or the time-division space-division switching matrix so that the decoded uplink data is borne in a corresponding timeslot of the second MII interface, the decoded uplink data is borne in the timeslot of the first MII interface by using the connection between the timeslot of the first MII interface and the timeslot of the second MII interface, and the decoded uplink data borne in the timeslot of the first MII interface is sent to the N1 Ethernet MAC ports.

With reference to the first aspect or any manner of the first possible implementation manner to the eighth possible implementation manner of the first aspect, in a ninth possible implementation manner, the connection device is further configured to disable some or all Ethernet physical layer interfaces of the K Ethernet physical layer interfaces.

According to the second aspect, a data transmission method is provided, where the method includes: implementing, by a connection device, data transmission between N1 Ethernet MAC ports of N Ethernet MAC ports and K1 Ethernet physical layer interfaces of K Ethernet physical layer interfaces by using a connection between a timeslot of a first MII interface and a timeslot of a second MII interface, where the connection between the timeslot of the first MII interface and the timeslot of the second MII interface is implemented by the connection device by controlling a time-division interconnect bus in the connection device or a time-division space-division switching matrix in the connection device, N and N1 are positive integers and N1≤N, and both K and K1 are positive integers and K1≤K; and the N Ethernet MAC ports are separately connected to the time-division interconnect bus in the connection device by using the corresponding first MII interfaces, and the K Ethernet physical layer interfaces are separately connected to the time-division interconnect bus in the connection device by using the corresponding second MII interfaces; or, the N Ethernet MAC ports are separately connected to the time-division space-division switching matrix in the connection device by using the corresponding first MII interfaces, and the K Ethernet physical layer interfaces are separately connected to the time-division space-division switching matrix in the connection device by using the corresponding second MII interfaces.

With reference to the second aspect, in a first possible implementation manner, the implementing, by a connection device, data transmission between N1 Ethernet MAC ports of N Ethernet MAC ports and K1 Ethernet physical layer interfaces of K Ethernet physical layer interfaces by using a connection between a timeslot of a first MII interface and a timeslot of a second MII interface may be specifically implemented as: implementing, by the connection device, uplink data transmission in a direction from the K1 Ethernet physical layer interfaces to the N1 Ethernet MAC ports by using the connection between the timeslot of the first MII interface and the timeslot of the second MII interface; or implementing, by the connection device, downlink data transmission in a direction from the N1 Ethernet MAC ports to the K1 Ethernet physical layer interfaces by using the connection between the timeslot of the first MII interface and the timeslot of the second MII interface.

With reference to the second aspect or the first possible implementation manner of the second aspect, in a second possible implementation manner, the method may be specifically implemented as: uplink data and/or downlink data is borne in some or all timeslots of P timeslots obtained by means of division, where P is a positive integer.

With reference to the second possible implementation manner of the second aspect, in a third possible implementation manner, the method may be specifically implemented as: controlling, by the connection device, the time-division interconnect bus or the time-division space-division switching matrix to converge the downlink data borne in the timeslots of the first MII interfaces, so that the converged downlink data is borne in the timeslot of the second MII interface by using the connection between the timeslot of the first MII interface and the timeslot of the second MII interface, and the converged downlink data borne in the timeslot of the second MII interface is sent to the K1 Ethernet physical layer interfaces; and encoding, by the K1 Ethernet physical layer interfaces, the converged downlink data, and transmitting encoded downlink data to a physical transmission channel.

With reference to the third possible implementation manner of the second aspect, in a fourth possible implementation manner, that the converged downlink data borne in the timeslot of the second MII interface is sent to the K1 Ethernet physical layer interfaces may be specifically implemented as: mapping the converged downlink data to J virtual channels that are of the K1 Ethernet physical layers and corresponding to the timeslot, where J is a positive integer.

With reference to the second possible implementation manner of the second aspect, in a fifth possible implementation manner, the method includes: receiving, by the K1 Ethernet physical layer interfaces, encoded uplink data from a physical transmission channel, decoding the encoded uplink data, and bearing and sending decoded uplink data to the connection device; and controlling, by the connection device, the time-division interconnect bus or the time-division space-division switching matrix so that the decoded uplink data is borne in a corresponding timeslot of the second MII interface, the decoded uplink data is borne in the timeslot of the first MII interface by using the connection between the timeslot of the first MII interface and the timeslot of the second MII interface, and the decoded uplink data borne in the timeslot of the first MII interface is sent to the N1 Ethernet MAC ports.

With reference to the fifth possible implementation manner of the second aspect, in a sixth possible implementation manner, that the decoded uplink data is borne in a corresponding timeslot of the second MII interface may be specifically implemented as that the decoded uplink data that is transmitted through J virtual channels of the K1 Ethernet physical layers is borne in the corresponding timeslot of the second MII interface.

According to a third aspect, a connection device is provided, where the connection device includes: a control module and a time-division interconnect bus, where the control module is configured to control the time-division interconnect bus to implement a connection between a timeslot of the first MII interface and a timeslot of the second MII interface, where the connection between the timeslot of the first MII interface and the timeslot of the second MII interface is implemented by the connection device by controlling the time-division interconnect bus in the connection device; and the N Ethernet MAC ports are separately connected to the time-division interconnect bus in the connection device by using the corresponding first MII interfaces, and the K Ethernet physical layer interfaces are separately connected to the time-division interconnect bus in the connection device by using the corresponding second MII interfaces.

According to a fourth aspect, another connection device is provided, where the connection device includes: a control module and a time-division space-division switching matrix, where the control module is configured to control the time-division space-division switching matrix to implement a connection between a timeslot of the first MII interface and a timeslot of the second MII interface, where the connection between the timeslot of the first MII interface and the timeslot of the second MII interface is implemented by the connection device by controlling the time-division space-division switching matrix in the connection device; and the N Ethernet MAC ports are separately connected to the time-division space-division switching matrix in the connection device by using the corresponding first MII interfaces, and the K Ethernet physical layer interfaces are separately connected to the time-division space-division switching matrix in the connection device by using the corresponding second MII interfaces.

According to a fifth aspect, still another connection device is provided, where the connection device includes: a processor, a controller, and a time-division interconnect bus, where the processor is configured to control the controller to control the time-division interconnect bus to implement a connection between a timeslot of the first MII interface and a timeslot of the second MII interface, where the connection between the timeslot of the first MII interface and the timeslot of the second MII interface is implemented by the connection device by controlling the time-division interconnect bus in the connection device; and the N Ethernet MAC ports are separately connected to the time-division interconnect bus in the connection device by using the corresponding first MII interfaces, and the K Ethernet physical layer interfaces are separately connected to the time-division interconnect bus in the connection device by using the corresponding second MII interfaces.

According to a sixth aspect, still another connection device is provided, where the connection device includes: a processor, a controller, and a time-division interconnect bus, where the processor is configured to control the controller to control the time-division space-division switching matrix to implement a connection between a timeslot of the first MII interface and a timeslot of the second MII interface, where the connection between the timeslot of the first MII interface and the timeslot of the second MII interface is implemented by the connection device by controlling the time-division space-division switching matrix in the connection device; and the N Ethernet MAC ports are separately connected to the time-division space-division switching matrix in the connection device by using the corresponding first MII interfaces, and the K Ethernet physical layer interfaces are separately connected to the time-division space-division switching matrix in the connection device by using the corresponding second MII interfaces.

Embodiments of the present invention provide a transmission apparatus, including: N Ethernet Medium Access Control MAC ports, where each Ethernet MAC port is corresponding to a first MII interface, K Ethernet physical layer interfaces, where each Ethernet physical layer interface is corresponding to a second MII interface, and a connection device, where both N and K are positive integers; where the connection device is configured to control a time-division interconnect bus in the connection device or a time-division space-division switching matrix in the connection device to implement a connection between a timeslot of the first MII interface and a timeslot of the second MII interface, where the N Ethernet MAC ports and the K Ethernet physical layer interfaces are separately connected to the time-division interconnect bus in the connection device by using the first MII interfaces and the second MII interfaces; or, the N Ethernet MAC ports and the K Ethernet physical layer interfaces are separately connected to the time-division space-division switching matrix in the connection device by using the first MII interfaces and the second MII interfaces. Therefore, by using the connection device, the apparatus can simultaneously support multiple Ethernet MAC ports, and provide an Ethernet MAC port with adjustable bandwidth, so as to increase flexibility of the transmission apparatus.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
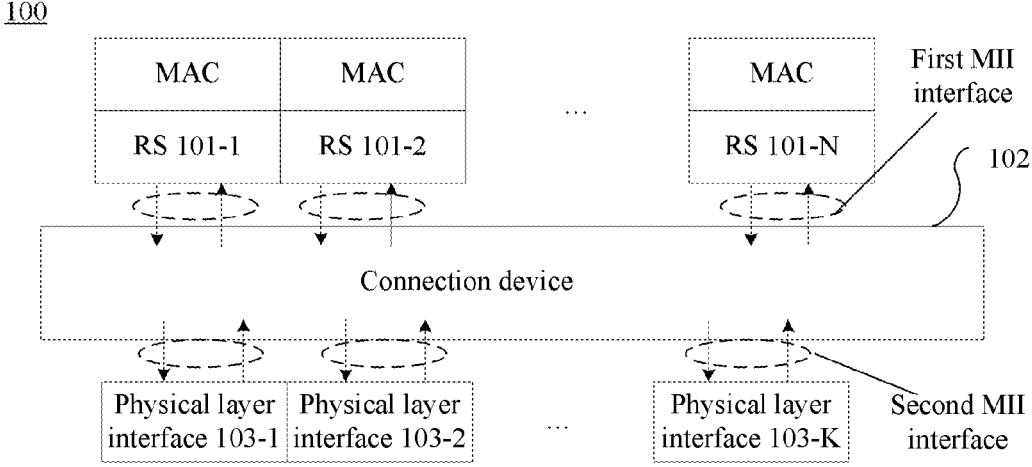
FIG. 1 is a schematic block diagram of a transmission apparatus according to an embodiment of the present invention.

FIG. 1 is a schematic block diagram of a transmission apparatus according to an embodiment of the present invention. A transmission apparatus 100 in FIG. 1 includes N Ethernet MAC ports, K Ethernet physical layer interfaces, and a connection device 102, where both N and K are positive integers; the N Ethernet MAC ports are separately a MAC/RS (Reconciliation Sublayer, reconciliation sublayer) 101-1, a MAC/RS 101-2, . . . , and a MAC/RS 101-N; and the K Ethernet physical layer interfaces are separately a physical layer interface 103-1, a physical layer interface 103-2, . . . , and a physical layer interface 103-K. Each Ethernet MAC port is corresponding to a first MII interface, and each Ethernet physical layer interface is corresponding to a second MII interface. It should be understood that this embodiment of the present invention does not set a limitation on a quantity of the Ethernet MAC ports and a quantity of the Ethernet physical layer interfaces, and there may be one or more. It should be further understood that this embodiment of the present invention does not set a limitation on a size of bandwidth of an Ethernet physical layer interface, which may be 100ME, 1GE, 10GE, 100GE, or 40GE, and so on; and this embodiment of the present invention does not set a limitation on bandwidth of each MAC port either. It should be noted that bandwidth of the Ethernet physical layer interfaces are not necessarily the same, and port rates of the MAC ports are also not necessarily the same.

For ease of description, in the example of the following embodiment, the bandwidth of the Ethernet physical layer interfaces is 100GE, which, however, is not intended to limit the scope of the present invention.

The connection device 102 is configured to control a time-division interconnect bus in the connection device to implement a connection between a timeslot of the first MII interface and a timeslot of the second MII interface, where the N Ethernet MAC ports are separately connected to the time-division interconnect bus in the connection device 102 by using the corresponding first MII interfaces, and the K Ethernet physical layer interfaces are separately connected to the time-division interconnect bus in the connection device 102 by using the corresponding second MII interfaces.

Alternatively, the connection device 102 is configured to control a time-division space-division switching matrix in the connection device to implement a connection between a timeslot of the first MII interface and a timeslot of the second MII interface, where the N Ethernet MAC ports are separately connected to the time-division space-division switching matrix in the connection device 102 by using the corresponding first MII interfaces, and the K Ethernet physical layer interfaces are separately connected to the time-division space-division switching matrix in the connection device 102 by using the corresponding second MII interfaces.

In this embodiment of the present invention, an MII interface may be a logical interface or a physical electrical interface. The first MII interface and the second MII interface in "a connection between a timeslot of the first MII interface and a timeslot of the second MII interface" described in this embodiment of the present invention are general concepts, which may be a connection between timeslots of all first MII interfaces of the N first MII interfaces and timeslots of some or all second MII interfaces of the K second MII interfaces, or may be a connection between timeslots of some first MII interfaces of the N first MII interfaces and timeslots of some or all second MII interfaces of the K second MII interfaces. This embodiment of the present invention does not set a limitation thereto.

It should be further noted that, in this embodiment of the present invention, a direction of data transmission from an Ethernet physical layer interface to an Ethernet MAC port is called an "uplink direction", and a direction of data transmission from an Ethernet MAC port to an Ethernet physical layer interface is called a "downlink direction". The Ethernet MAC port may be construed as a port of a whole formed by a MAC layer and an RS layer, and a total port rate of the N Ethernet MAC ports is determined by total bandwidth of the K Ethernet physical layer interfaces.

Figure 2:
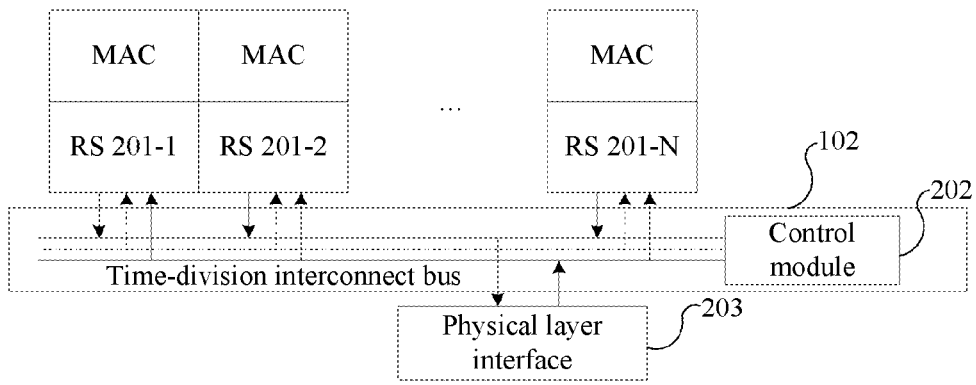
FIG. 2 is a schematic block diagram of a transmission apparatus according to another embodiment of the present invention.

Preferably, when K=1, the connection device 102 is configured to control the time-division interconnect bus in the connection device to implement the connection between the timeslot of the first MII interface and the timeslot of the second MII interface, that is, the connection device implements a connection between the N Ethernet MAC ports and one Ethernet physical layer interface by using the time-division interconnect bus, in other words, the N Ethernet MAC ports share the one Ethernet physical layer interface. For example, as shown in FIG. 2, a connection between N Ethernet MAC ports and an Ethernet physical layer interface 203 with a bandwidth of 100GE is implemented by a control module 202 in a connection device 102 by controlling a time-division interconnect bus, where the N Ethernet MAC ports are a MAC/RS 201-1, a MAC/RS 201-2, . . . , and a MAC/RS 201-N. The time-division (multiplexing) interconnect bus provides, in a determined timeslot and in a manner of timeslot TDM (Time Division Multiplexing, Time Division Multiplexing), a connection for uplink and downlink data transmission between a particular Ethernet MAC port and the Ethernet physical layer interface 203. In any timeslot, there is only one Ethernet MAC port occupying the Ethernet physical layer interface 203 by using the time-division interconnect bus. A work clock and a bit width of the TDM interconnect bus are determined by bandwidth of a physical layer interface. For example, a work clock of a 40GE XLGMII (40 Gbps MII) interface bus is 625 MHz, and a bit width of the interface bus is 64 bit; and a work clock of a 100GE CGMII interface (100 Gbps MII) bus is 1562.5 MHz, and a bit width of the interface bus is 64 bit.

Waste may be reduced and utilization of a capacity of a physical interface module may be increased by using the foregoing solution. For example, a 100GE physical interface module can be used to support two MAC ports with a rate of 50 Gbp.

Figure 3A:
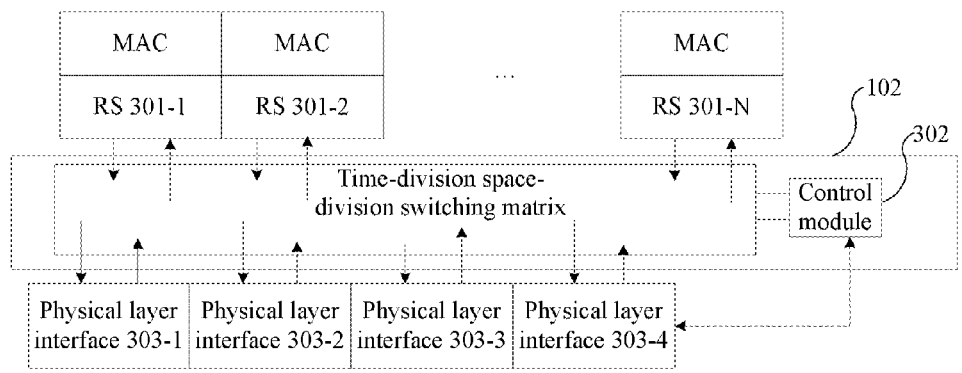
FIG. 3A is a schematic block diagram of a transmission apparatus according to another embodiment of the present invention.
Figure 3B:
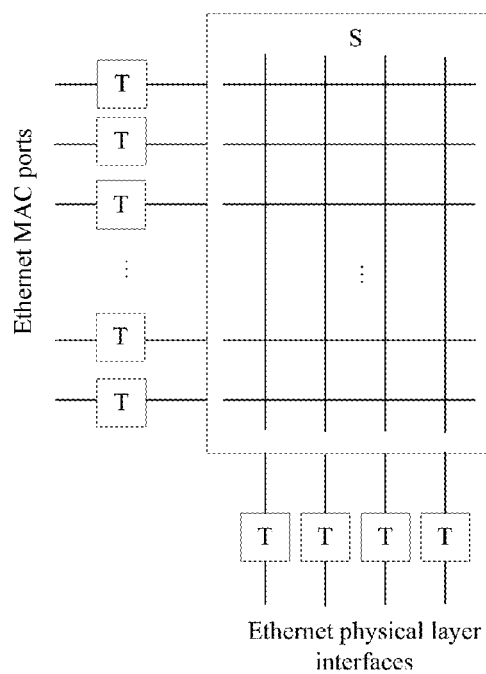
FIG. 3B is a schematic diagram of a time-division space-division switching matrix according to an embodiment of the present invention.

Preferably, when K>1, the connection device 102 is configured to control the time-division space-division switching matrix in the connection device to implement the connection between the timeslot of the first MII interface and the timeslot of the second MII interface, that is, the connection device implements a connection between the N Ethernet MAC ports and the K Ethernet physical layer interfaces by using the time-division space-division switching matrix, in other words, the N Ethernet MAC ports share multiple Ethernet physical layer interfaces. For example, as shown in FIG. 3A, an interconnection between N Ethernet MAC ports and four Ethernet physical layer interfaces with a bandwidth of 100GE is implemented by a control module 302 in a connection device 102 by controlling a time-division space-division switching matrix, where the N Ethernet MAC ports are a MAC/RS 201-1, a MAC/RS 201-2, . . . , and a MAC/RS 201-N, and the four Ethernet physical layer interfaces are a physical layer interface 303-1, a physical layer interface 303-2, a physical layer interface 303-3, and a physical layer interface 303-4. Optionally, the time-division space-division switching matrix may be a TDM T-S-T switching matrix as shown in FIG. 3B. In addition, an uplink direction and a downlink direction may use independent time-division space-division switching matrices, or an uplink direction and a downlink direction use a same time-division space-division switching matrix.

It should be understood that in the foregoing example, bandwidth of the Ethernet physical layer interfaces, a quantity of the Ethernet physical layer interfaces, and a manner of implementing the connection between the timeslot of the first MII interface and the timeslot of the second MII interface are merely exemplary, and are not intended to limit the scope of the present invention.

This embodiment of the present invention provides a transmission apparatus, including: N Ethernet Medium Access Control MAC ports, where each Ethernet MAC port is corresponding to a first MII interface, K Ethernet physical layer interfaces, where each Ethernet physical layer interface is corresponding to a second MII interface, and a connection device, where both N and K are positive integers; where the connection device is configured to control a time-division interconnect bus in the connection device or a time-division space-division switching matrix in the connection device to implement a connection between a timeslot of the first MII interface and a timeslot of the second MII interface, where the N Ethernet MAC ports and the K Ethernet physical layer interfaces are separately connected to the time-division interconnect bus in the connection device by using the first MII interfaces and the second MII interfaces; or, the N Ethernet MAC ports and the K Ethernet physical layer interfaces are separately connected to the time-division space-division switching matrix in the connection device by using the first MII interfaces and the second MII interfaces. Therefore, by using the connection device, the apparatus can simultaneously support multiple Ethernet MAC ports, and provide an Ethernet MAC port with adjustable bandwidth, so as to increase flexibility of the transmission apparatus.

As another embodiment of the present invention, functions of the connection device 102 of the apparatus may be further expanded.

Exemplarily, the connection device 102 may be further configured to configure and control timeslot division, which specifically is obtaining P timeslots by means of division and allocating some or all timeslots of the P timeslots to some or all ports of the N Ethernet MAC ports, where P is a positive integer. One Ethernet MAC port may occupy one or more timeslots, or may occupy no timeslot. Timeslots in the P timeslots may be equal or unequal, and this embodiment of the present invention does not set a limitation thereto. Optionally, an uplink direction or a downlink direction of each timeslot of an MII interface may be corresponding to one or more code blocks (such as a 64/66b code block), that is, a bandwidth granularity corresponding to each timeslot may be 5G, 10G, or the like. It should be understood that the embodiment of the present invention does not set a limitation on a quantity of timeslots obtained by means of division, and does not set a limitation on a form of a code block corresponding to a timeslot either.

Optionally, the connection device 102 may be specifically configured to allocate a timeslot in a static manner, or may allocate a timeslot in a dynamic manner, where the static manner indicates that a timeslot is pre-allocated, and the dynamic manner indicates that timeslot allocation may be dynamically adjusted, for example, a timeslot is allocated according to a service demand or a feature of a transmission link.

Figure 4:
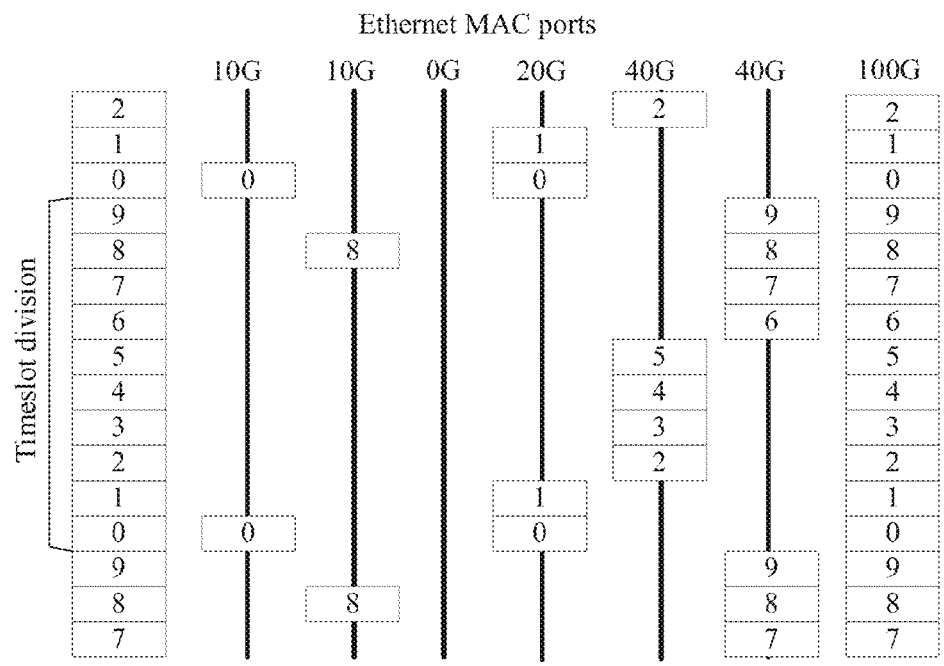
FIG. 4 is a schematic diagram of timeslot allocation according to an embodiment of the present invention.

The following describes a specific embodiment of timeslot allocation in detail with reference to an example in FIG. 4.

Specifically, in FIG. 4, in an example for description, bandwidth of a physical interface is 100GE, and a value of P is 10, where a connection device 102 is configured to obtain 10 equal timeslots by means of division, which are separately a timeslot 9, a timeslot 8, . . . , and a timeslot 0, and the timeslots are periodically repeated. Further, the connection device 102 is configured to give the timeslots separately to one or more Ethernet MAC ports, where bandwidth of each Ethernet MAC port does not exceed the bandwidth of the physical interface. For example, the connection device 102 may be configured to allocate the timeslot 0 to an Ethernet MAC port, where bandwidth of the Ethernet MAC port is 10G; may be configured to allocate the timeslot 8 to an Ethernet MAC port, where bandwidth of the Ethernet MAC port is 10G; may be configured to allocate the timeslot 1 and the timeslot 0 to an Ethernet MAC port, where bandwidth of the Ethernet MAC port is 20G; may be configured to allocate the timeslot 5, the timeslot 4, the timeslot 3, and the timeslot 2 to an Ethernet MAC port, where bandwidth of the Ethernet MAC port is 40G; may be configured to allocate the timeslot 9, the timeslot 8, the timeslot 7, and the timeslot 6 to an Ethernet MAC port, where bandwidth of the Ethernet MAC port is 40G; may be configured to allocate the 10 timeslots to an Ethernet MAC port, where bandwidth of the Ethernet MAC port is 100G; or the like. The connection device 102 may further skip allocating a timeslot to an Ethernet MAC port, where bandwidth of the Ethernet MAC port is 0, that is, the Ethernet MAC port is idle. Optionally, the connection device 102 may be further configured to allocate consecutive timeslots to an Ethernet MAC port, or may be configured to allocate inconsecutive timeslots to an Ethernet MAC port.

Optionally, one interface of the K Ethernet physical layer interfaces has J virtual channels, or multiple interfaces of the K Ethernet physical layer interfaces have J virtual channels altogether.

The connection device 102 may be further configured to map and connect some or all timeslots of the foregoing P timeslots to the J virtual channels, where each virtual channel is used to provide bandwidth by using the foregoing second MII interface, and J is a positive integer. Optionally, a 802.3ba MLD (Multi-lane Distribution, multi-lane distribution) mechanism may be used. For example, a timeslot-based CGMII interface timeslot is corresponding to two MLD virtual channels.

Exemplarily, the connection device 102 may be further configured to implement data transmission between N1 Ethernet MAC ports and K1 Ethernet physical layer interfaces by using the connection between the timeslot of the first MII interface and the timeslot of the second MII interface, where the N Ethernet MAC ports include the N1 Ethernet MAC ports, where N1 is a positive integer and N1≤N; and the K Ethernet physical layer interfaces include the K1 Ethernet physical layer interfaces, where K1 is a positive integer and K1≤K. The data transmission may be simultaneous transmission of data in an uplink direction and a downlink direction, or may be data transmission in a particular direction (uplink or downlink), that is, data transmission from an Ethernet MAC port to an Ethernet physical layer interface, or data transmission from a physical layer interface to an Ethernet MAC port. The connection device 102 may be further configured to implement uplink data transmission in a direction from the K1 Ethernet physical layer interfaces to the N1 Ethernet MAC ports by using the connection between the timeslot of the first MII interface and the timeslot of the second MII interface; or implement downlink data transmission in a direction from the N1 Ethernet MAC ports to the K1 Ethernet physical layer interfaces by using the connection between the timeslot of the first MII interface and the timeslot of the second MII interface.

Optionally, the connection device 102 may be further configured to control the time-division interconnect bus or the time-division space-division switching matrix to converge downlink data borne in the timeslots of the first MII interfaces, so that the converged downlink data is borne in the timeslot of the second MII interface by using the connection between the timeslot of the first MII interface and the timeslot of the second MII interface, and the converged downlink data borne in the timeslot of the second MII interface is sent to the K1 Ethernet physical layer interfaces, which specifically is mapping the converged downlink data borne in the timeslot of the second MII interface to the J virtual channels that are corresponding to the timeslot and of the K1 Ethernet physical layers. The K1 Ethernet physical layers (such as a PCS layer) may be configured to encode the converged downlink data, and transmit encoded downlink data to a physical transmission channel.

Optionally, the K1 Ethernet physical layers are configured to receive encoded uplink data from a physical transmission channel, decode the encoded uplink data, and send decoded uplink data to the connection device 102. The connection device 102 is further configured to control the time-division interconnect bus or the time-division space-division switching matrix to make the decoded uplink data be borne in a corresponding timeslot of the second MII interface, which specifically is making the decoded uplink data that is transmitted through the J virtual channels of the K1 Ethernet physical layers be borne in the corresponding timeslot of the second MII interface, so that the decoded uplink data is borne in the timeslot of the first MII interface by using the connection between the timeslot of the first MII interface and the timeslot of the second MII interface, and the decoded uplink data borne in the timeslot of the first MII interface is sent to the N1 Ethernet MAC ports.

Optionally, the connection device 102 may be further configured to mark the foregoing timeslots obtained by means of division. Timeslots are differentiated according to marks of the timeslots, so as to facilitate management and control, achieve that each data stream is transmitted on a corresponding physical interface, increase data transmission accuracy, and avoid a disorder of data packets of a same stream. Optionally, the connection device 102 may be further configured to instruct each MAC port to transmit valid data in an allocated corresponding timeslot, or may instruct each MAC port to skip transmitting data or transmit invalid data. A MAC port may be completely idle when no service demand is required, and the connection device 102 may be configured to provide bandwidth of the MAC port to another MAC port for use.

Exemplarily, the connection device 102 may be further configured to disable some or all Ethernet physical layer interfaces of the K Ethernet physical layer interfaces, such as disabling an Ethernet physical layer interface that is not configured to transmit data. In this way, power consumption of the apparatus can be effectively reduced, and a life circle of a device is prolonged, thereby reducing operation and maintenance costs of the apparatus.

The following describes this embodiment of the present invention in detail with reference to examples in FIG. 5 to FIG. 8.

For example, in the transmission apparatus in FIG. 2, it is assumed that N=5, that is, Ethernet MAC ports are a MAC/RS 201-1, a MAC/RS 201-2, a MAC/RS 201-3, a MAC/RS 201-4, and a MAC/RS 201-5. Optionally, the connection device 102 may be configured to obtain 10 equal timeslots by means of division, where bandwidth of an Ethernet physical layer interface 203 is 100GE, and each timeslot is corresponding to a 64/66 code block, that is, a corresponding bandwidth granularity is 10G. The connection device 102 may be further configured to allocate some or all timeslots of the 10 timeslots to some or all ports of the five Ethernet MAC ports.

Figure 5A:
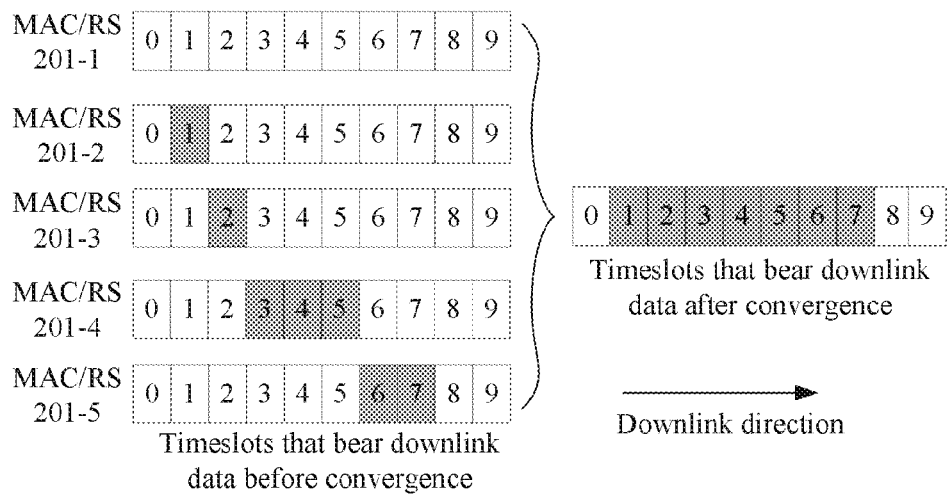
FIG. 5A to FIG. 5D are schematic diagrams of timeslot allocation according to another embodiment of the present invention.

As shown in FIG. 5A, the connection device 102 is further configured to allocate a timeslot 1 to the MAC/RS 201-2, a timeslot 2 to the MAC/RS 201-3; and allocate consecutive timeslots to a MAC port, for example, the MAC/RS 201-4 occupies a timeslot 3, a timeslot 4, and a timeslot 5, and the MAC/RS 201-5 occupies a timeslot 6 and a timeslot 7. The connection device 102 may skip allocating a timeslot to a MAC port, such as the MAC/RS 201-1. The connection device 102 is further configured to instruct each MAC port to transmit data in an allocated corresponding timeslot of a first MII interface. Optionally, if a time-division bus is used, in a case in which there is only one Ethernet physical layer interface, an MII interface connected to the Ethernet physical layer interface provides timeslots with a same serial number to only one MAC port in any period. For example, when the timeslot 1 is provided to the MAC/RS 201-2 for use in a particular period, then in this period, the timeslot 1 is no longer provided to another MAC port. For another example, the MAC/RS 201-5 may transmit valid data, invalid data, or the like in the timeslot 3, the timeslot 4, and the timeslot 5. The MAC/RS 201-5 may be completely idle when no service demand is required, and the connection device 102 may be configured to provide the timeslot 3, the timeslot 4, and the timeslot 5 to another MAC port for use.

Figure 5B:
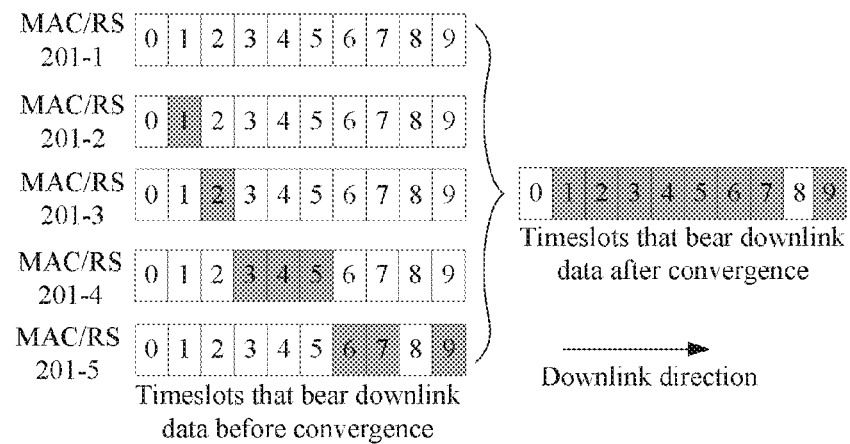
Figure 5C:
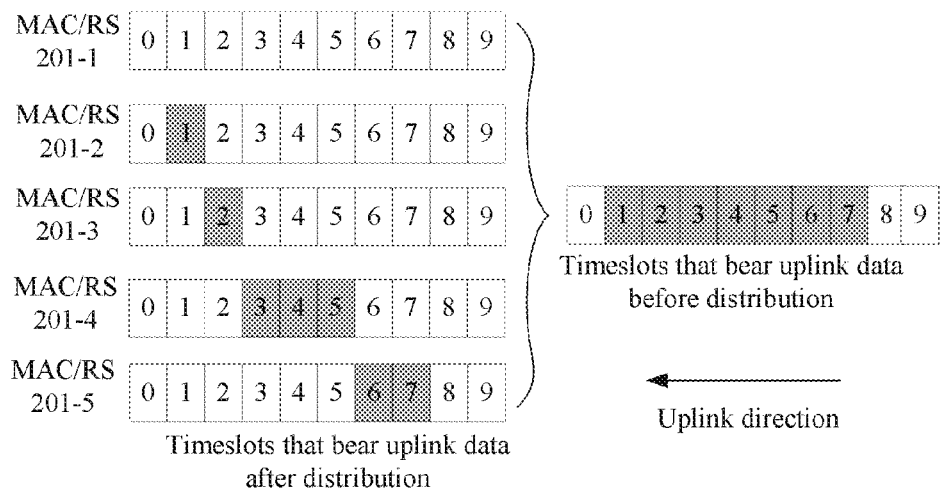

Optionally, when data transmission is in a direction from the an Ethernet MAC port to an Ethernet physical layer interface, the connection device 102 may be configured to control the time-division interconnect bus to converge data borne in timeslots of first MII interfaces connected to MAC ports, so that the converged downlink data is borne in the timeslot of the second MII interface by using a connection between the timeslot of the first MII interface and a timeslot of a second MII interface. Certainly, the connection device 102 may be also configured to allocate inconsecutive timeslots to an Ethernet MAC port. As shown in FIG. 5B, a MAC/RS 201-5 occupies a timeslot 6, a timeslot 7, and a timeslot 9; and a timeslot 8 is idle. An example in FIG. 5B is similar to that in FIG. 5A, and details are not described herein again.

Figure 5D:
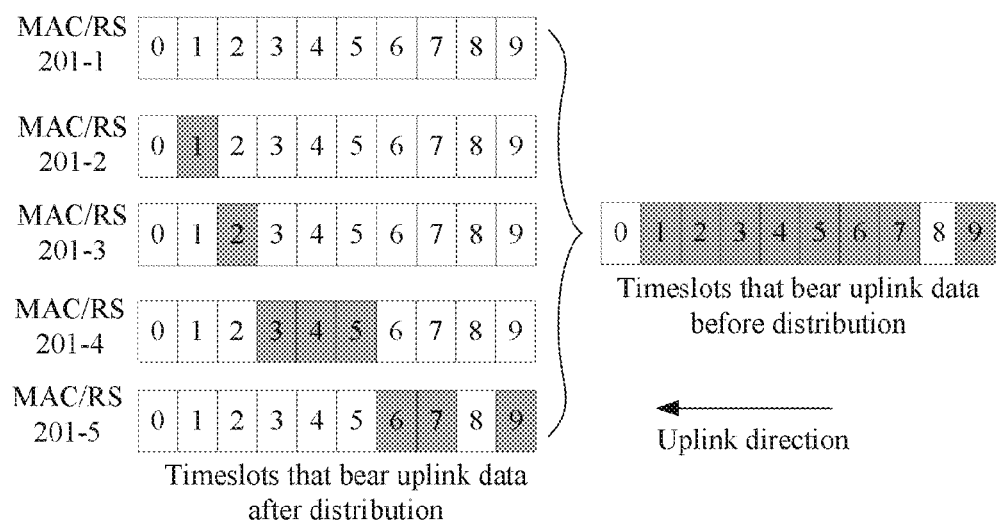

Optionally, when data transmission is in a direction from an Ethernet physical layer interface to an Ethernet MAC port, the connection device 102 controls the time-division interconnect bus to distribute, by using a connection between a timeslot of a first MII interface and a timeslot of a second MII interface, uplink data borne in the timeslot of the second MII interface connected to the Ethernet physical layer interface to the corresponding timeslot of the first MII interface connected to the Ethernet MAC port. As shown in FIG. 5-3, in a particular period, a timeslot 1 to a timeslot 7 of the second MII interface connected to the Ethernet physical layer interface bear the uplink data, and the connection device 102 controls the time-division interconnect bus to distribute uplink data borne in the timeslot 1 of the second MII interface connected to the Ethernet physical layer interface to a timeslot 1 of a first MII interface connected to a MAC/RS 201-2 port, and similarly, distribute uplink data borne in the timeslot 2 of the second MII interface connected to the Ethernet physical layer interface to a timeslot 2 of a first MII interface connected to a MAC/RS 201-3 port, distribute uplink data borne in the timeslots 3 to 5 of the second MII interface connected to the Ethernet physical layer interface to timeslots 3 to 5 of a first MII interface connected to a MAC/RS 201-4 port, and distribute uplink data borne in the timeslots 6 to 7 of the second MII interface connected to the Ethernet physical layer interface to timeslots 6 to 7 of a first MII interface connected to a MAC/RS 201-5 port. Certainly, in data transmission in a downlink direction, a MAC port may also occupy inconsecutive timeslots. As shown in FIG. 5D, a MAC/RS 201-5 occupies a timeslot 6, a timeslot 7, and a timeslot 9; and a timeslot 8 is idle. An example in FIG. 5D is similar to that in FIG. 53, and details are not described herein again.

Therefore, a MAC port may occupy a high percentage of number of timeslots of an MII interface connected to a physical interface, which may reduce waste, thereby increasing utilization of the physical interface.

For another example, in the apparatus in FIG. 3, it is assumed that N=4, that is, Ethernet MAC ports are a MAC/RS 301-1, a MAC/RS 301-2, a MAC/RS 301-3, and a MAC/RS 301-4, bandwidth of each Ethernet physical layer interface is 100GE, and bandwidth of four physical layer interfaces is 400GE. Optionally, the connection device 102 may be configured to obtain 40 equal timeslots by means of division, where each timeslot is corresponding to a 64/66 code block, that is, a corresponding bandwidth granularity is 10G, and each physical layer interface is corresponding to 10 timeslots. The connection device 102 may be further configured to allocate some or all timeslots of the 40 timeslots to some or all ports of the four Ethernet MAC ports.

Figure 6A:
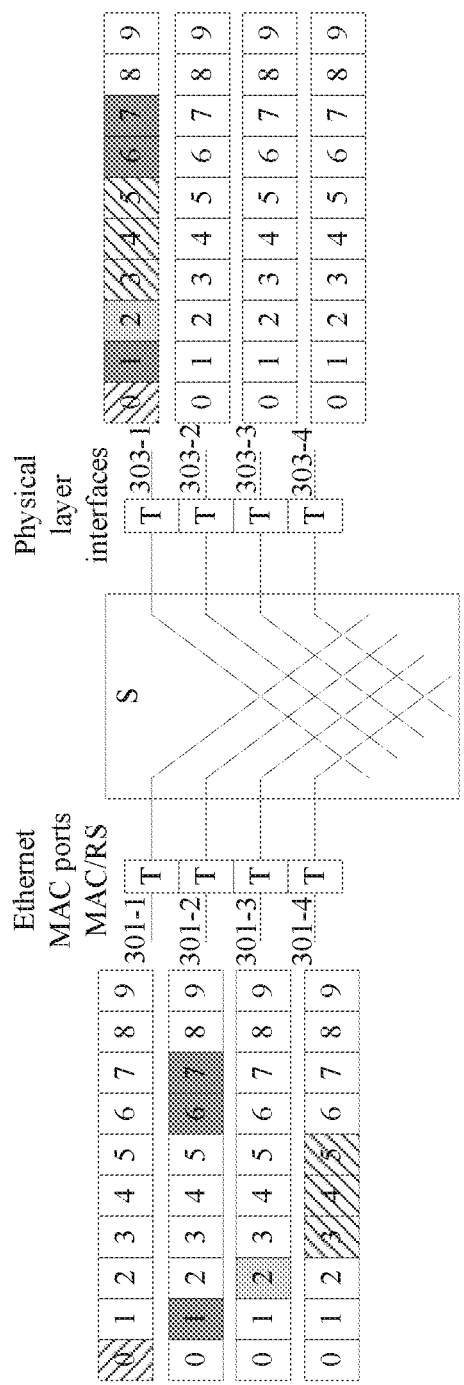
FIG. 6A to FIG. 6C are schematic diagrams of timeslot allocation according to still another embodiment of the present invention.
Figure 6B:
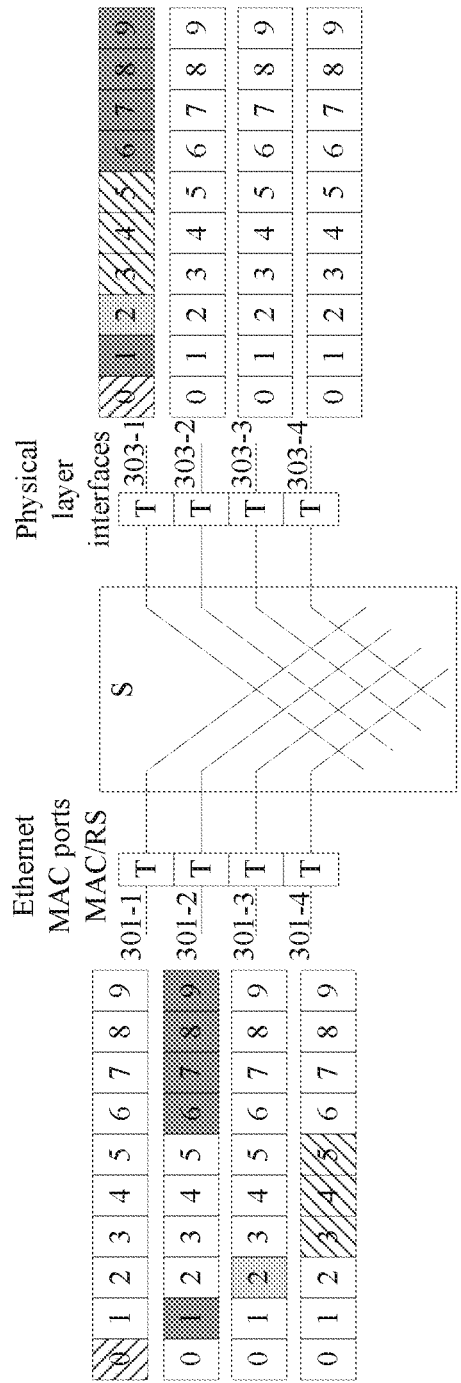

As shown in FIG. 6A, the connection device 102 is configured to allocate a timeslot 0 to an Ethernet MAC port MAC/RS 301-1, allocate a timeslot 1, a timeslot 6, and a timeslot 7 to a MAC/RS 301-2, allocate a timeslot 2 to a MAC/RS 301-3, allocate a timeslot 3, a timeslot 4, and a timeslot 5 to a MAC/RS 301-4, and implement, by using a TDM T-S-T matrix, a connection between a timeslot of a first MII interface corresponding to an Ethernet MAC port and a timeslot of a second MII interface corresponding to a physical layer interface. Optionally, when data transmission is in a direction from an Ethernet MAC port to an Ethernet physical layer interface, the connection device 102 may be configured to control the time-division space-division switching matrix to converge data borne in timeslots of first MII interfaces corresponding to different Ethernet MAC ports to a physical layer interface 303-1, that is, the data is transmitted through one physical channel, in other words, the connection device 102 may be configured to disable a physical layer interface 303-2, a physical layer interface 303-3, and a physical layer interface 303-4. In FIG. 6A, a timeslot 8 and a timeslot 9 of the physical layer interface 303-1 are idle, that is, the four Ethernet MAC ports occupy some timeslots of the physical layer interface 303-1. Certainly, the four Ethernet MAC ports may occupy all the timeslots of the physical layer interface 303-1. As shown in FIG. 6B, the connection device 102 may be further configured to allocate a timeslot 1, a timeslot 6, a timeslot 7, a timeslot 8, and a timeslot 9 to a MAC/RS 301-2.

Figure 6C:
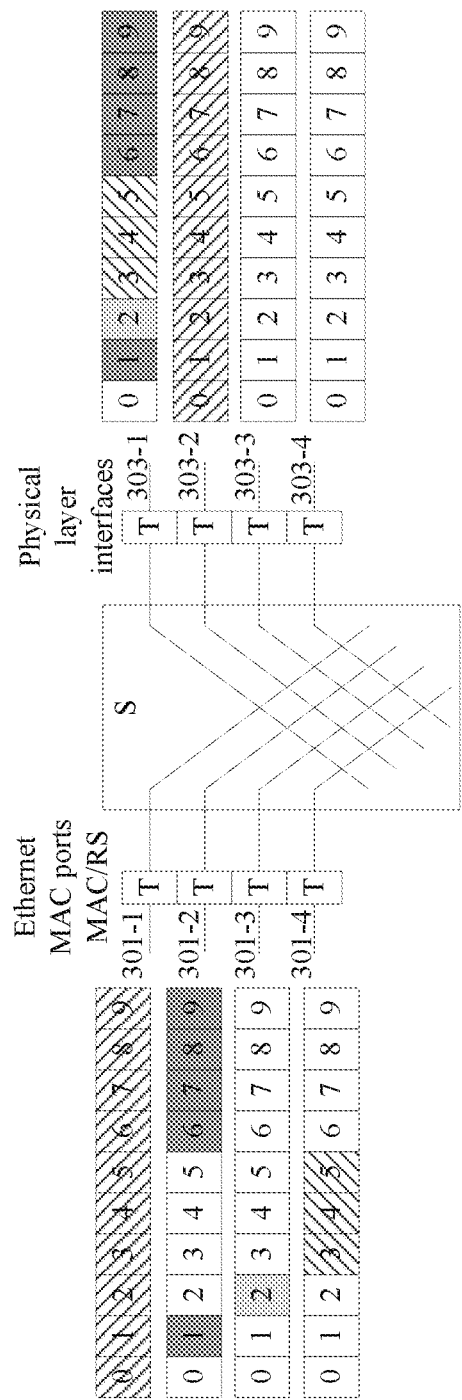

As shown in FIG. 6C, the connection device 102 is configured to allocate 10 timeslots, which are separately a timeslot 0, a timeslot 1, . . . , and a timeslot 9, to a physical layer interface 303-1; allocate five timeslots, which are separately a timeslot 1, a timeslot 6, a timeslot 7, a timeslot 8, and a timeslot 9, to a physical layer interface 303-2; allocate a timeslot 2 to a physical layer interface 303-3; and allocate a timeslot 3, a timeslot 4, and a timeslot 5 to a physical layer interface 303-4. A commonly used T-S-T switching network has time-division switching and space-division switching capabilities. Each Ethernet MAC port transmits data in an allocated corresponding timeslot of the first MII interface. Because the T-S-T switching network is introduced and there are four physical interfaces, different Ethernet MAC ports may transmit data simultaneously in timeslots with a same serial number, however, a total traffic cannot exceed bandwidth provided by a physical interface that is not disabled, in other words, in N1×10 timeslots (a timeslot 0 to a timeslot 9, N1), a quantity of timeslots actually allocated for use cannot be greater than K1×10 timeslots (a timeslot 0 to a timeslot 9, K1). In timeslots of a first MII interface connected to an Ethernet MAC port, in a particular period, timeslots with a same serial number may be occupied by multiple MAC ports (a quantity of MAC ports may be less than, greater than, or equal to a quantity of Ethernet physical layer interfaces that are not disabled); however, for an MII interface connected to an Ethernet physical layer interfaces, in this period, timeslots with a same serial number can be provided only to a same quantity of MAC ports as that of the Ethernet physical layer interfaces that are not disabled. Optionally, when data transmission is in the direction from an Ethernet MAC port to an Ethernet physical layer interface, the connection device 102 may be configured to control the time-division space-division switching matrix to converge downlink data borne in timeslots of first MII interfaces corresponding to different Ethernet MAC ports to a physical layer interface 303-1 and a physical layer interface 303-2; and a physical layer interface 303-3 and a physical layer interface 303-4 are not used. Optionally, when data transmission is in a direction from an Ethernet physical layer interface to an Ethernet MAC port, the connection device 102 may be configured to control the time-division space-division switching matrix to distribute uplink data borne in a timeslot of a corresponding second MII interface on the physical layer interface to a corresponding timeslot of a first MII interface of the Ethernet MAC port.

It should be understood that the foregoing examples are merely exemplary, and are not intended to limit the scope of the present invention.

By using the foregoing solution, sharing of a physical interface module and a communication channel can be implemented according to a bandwidth demand of a MAC port on an apparatus, which increases utilization of a physical interface and a transmission channel. For another example, all or some physical layer interfaces may be temporarily disabled to reduce power consumption of the apparatus. In this way, a life cycle of a device may be effectively prolonged, thereby reducing operation and maintenance costs of the apparatus.

Figure 7:
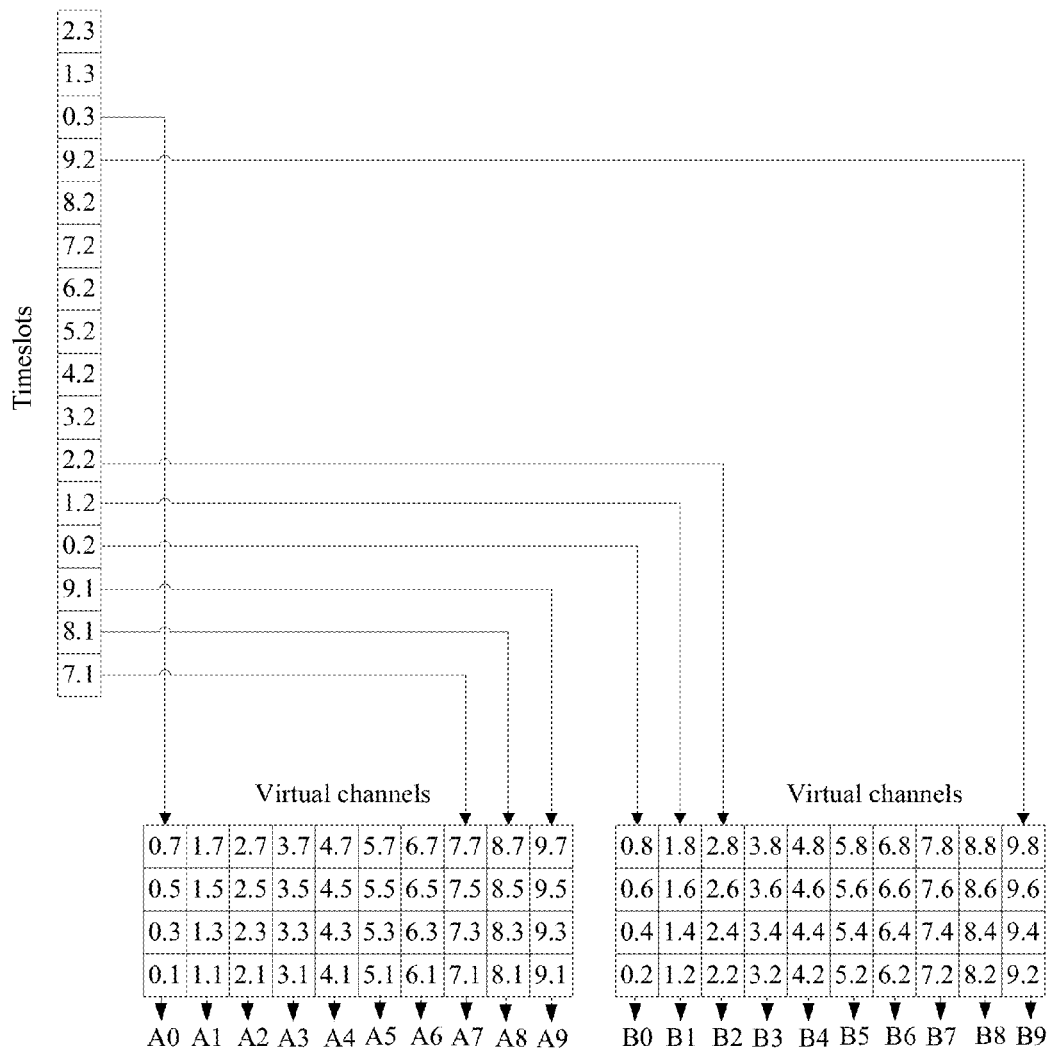
FIG. 7 is a schematic diagram of a correspondence between a timeslot and a virtual channel according to an embodiment of the present invention.

An embodiment of a virtual channel is shown in FIG. 7. For ease of description, an Ethernet physical interface with a bandwidth of 100GE is used as an example, where there are 10 timeslots that are corresponding to a downlink connection and of the Ethernet physical interface, and the Ethernet physical interface has 20 virtual channels, which are separately A0-A9 and B0-B9, where a bandwidth granularity provided by each virtual channel is 5G, and the 10 timeslots are corresponding to the 20 virtual channels, which may also be construed that each timeslot is mapped and connected to two virtual channels. For example, data transmission is in a direction from an Ethernet MAC port to an Ethernet physical layer interface, and downlink data borne in each timeslot of a second MII interface is allocated to two virtual channels after undergoing 64/66 encoding. For example, in FIG. 7, a timeslot 9 is marked as 9.1 in a first period and is marked as 9.2 in a second period; downlink data borne in a timeslot 9 in an odd-numbered period is transmitted through the virtual channel A9, and data borne in a timeslot 9 in an even-numbered period is transmitted through the virtual channel B9. For another example, when data transmission is in a direction from an Ethernet physical layer interface to an Ethernet MAC port, uplink data transmitted through a virtual channel is borne in a timeslot of a corresponding second MII interface.

Exemplarily, the connection device 102 may be further configured to extend a bit width or increase a clock rate for any MAC port of the N Ethernet MAC ports, so that a MAC port capacity with transmission capabilities of multiple physical interfaces is supported, thereby increasing bandwidth. In this way, one Ethernet MAC port may occupy bandwidth of multiple physical interfaces. In should be understood that any manner of extending bandwidth of an Ethernet MAC port falls within the scope of the present invention.

Figure 8A:
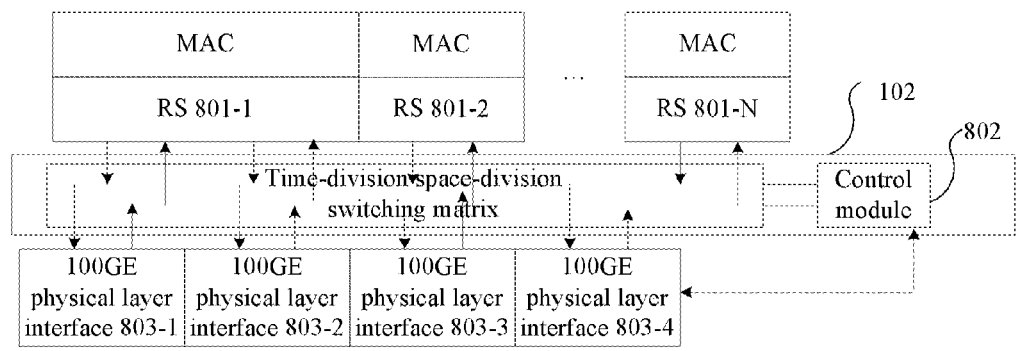
FIG. 8A to FIG. 8C are schematic block diagrams of a transmission apparatus according to still another embodiment of the present invention.
Figure 8B:
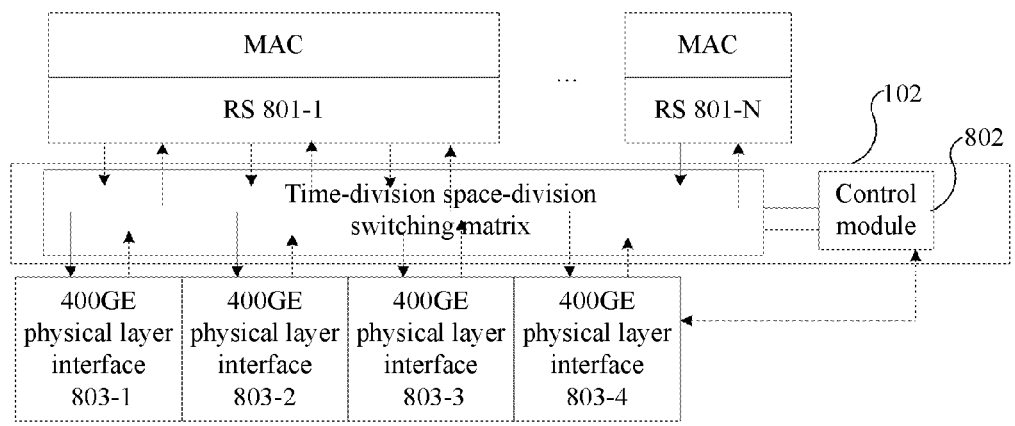
Figure 8C:
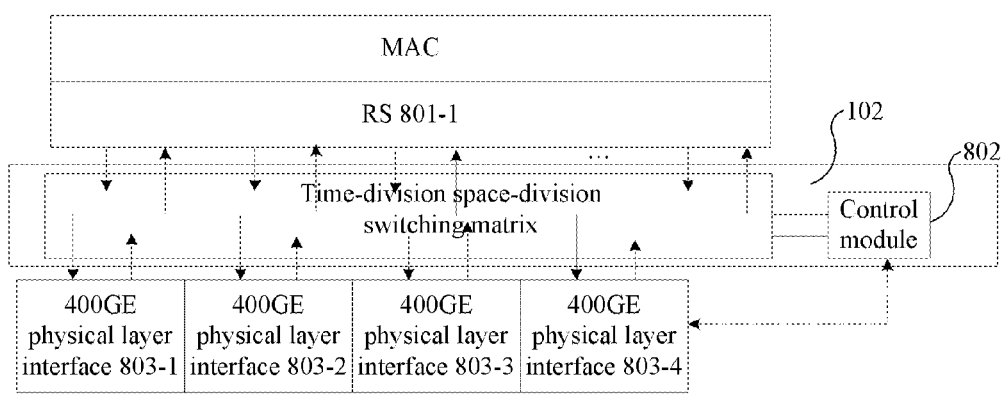

As an example, a time-division space-division switching matrix implements a connection between a timeslot of a first MII interface and a timeslot of a second MII interface, as shown in FIG. 8A. In a schematic diagram of a transmission apparatus in FIG. 8A, it is assumed that K=4, and bandwidth of each Ethernet physical layer interface is 100GE. A connection device 102 is configured to implement, in a manner of increasing a clock rate, that bandwidth supported by an Ethernet MAC port (for example, a MAC/RS 801-1) occupies bandwidth supported by two MAC ports, so that a MAC port capacity with transmission capabilities of two physical interfaces is supported. Assuming that a maximum bandwidth supported by an original MAC/RS 801-1 is 100GE, a MAC/RS 801-1 after bit width extension supports a MAC port capacity with transmission capabilities of two physical interfaces and a capacity thereof is 200G. In a schematic diagram of a transmission apparatus in FIG. 8B, as an example, K=4 and bandwidth of each Ethernet physical layer interface is 400GE. A connection device 102 is configured to implement that a MAC/RS 801-1 occupies bandwidth supported by three MAC ports. Therefore, a MAC port capacity supported by the MAC/RS 801-1 is 1200G. In a schematic diagram of a transmission apparatus in FIG. 8C, a connection device 102 is configured to implement that a MAC/RS 801-1 occupies bandwidth supported by all MAC ports. Therefore, MAC/RS 801-1 supports a MAC port capacity with transmission capabilities of all physical interfaces, that is, a supported maximum bandwidth is total bandwidth of all the physical layer interfaces. Assuming that K=4 and bandwidth of each Ethernet physical layer interface is 400GE, a supported maximum bandwidth is 1600GE; and the like.

Figure 9A:
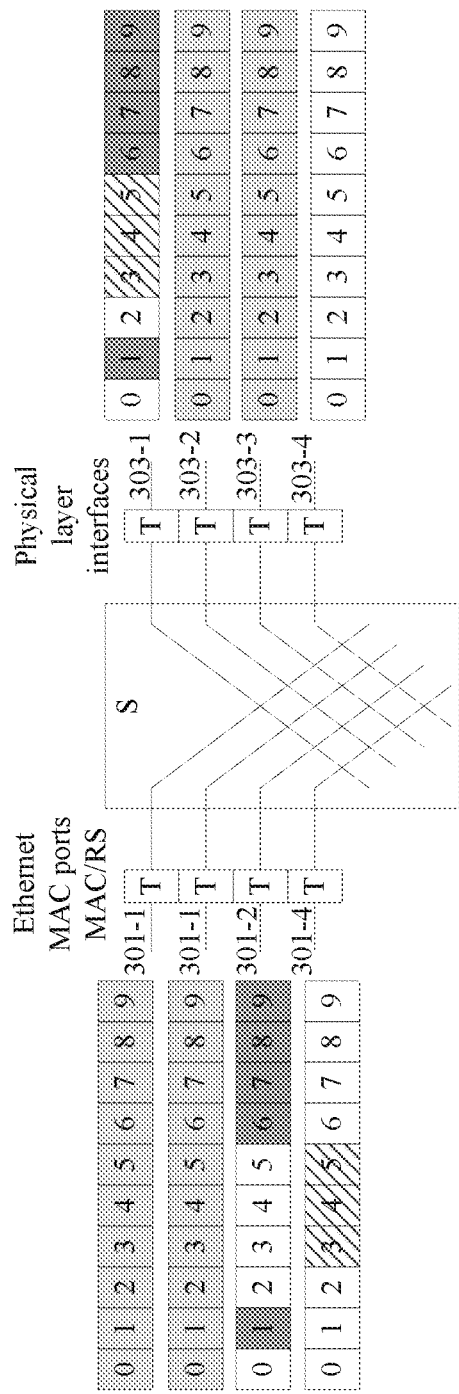
FIG. 9A to FIG. 9B are schematic flowcharts of timeslot allocation according to yet another embodiment of the present invention.
Figure 9B:
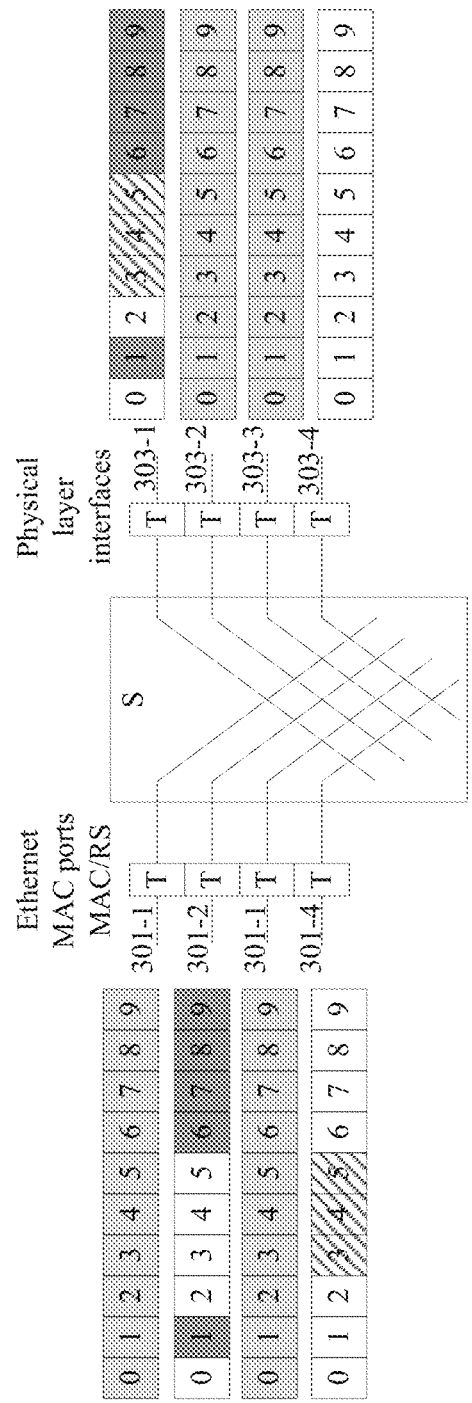

Specifically, the connection device 102 may be configured to enable, by extending a bit width, that is, in a manner of allocating more timeslots to an Ethernet MAC port, the Ethernet MAC port to support a MAC port capacity with transmission capabilities of multiple physical interfaces. As shown in FIG. 9A and FIG. 9B, in FIG. 9A and FIG. 9B, for ease of description, with reference to the transmission apparatus in FIG. 3, as an example, K=4, bandwidth of each Ethernet physical layer interface is 100GE, and the connection device 102 obtains 40 equal timeslots by means of division, and each timeslot is corresponding to a 64/66 code block. It should be understood that this embodiment of the present invention does not set a limitation thereto. In FIG. 9A and FIG. 9B, the connection device 102 is configured to control the time-division space-division switching matrix to allocate 20 timeslots to an Ethernet MAC port MAC/RS 301-1, so that the MAC/RS 301-1 supports a MAC port capacity with transmission capabilities of two physical layer interfaces, that is, 200G.

It should be understood that the foregoing examples are merely exemplary, and are not intended to limit the scope of the present invention.

Therefore, a transmission apparatus according to this embodiment of the present invention may adjust bandwidth usage of each Ethernet MAC port according to a demand (such as a service condition) of each Ethernet MAC port, thereby increasing flexibility of the transmission apparatus.

In addition, the implementation manners of the present invention may also be applied between other physical layer interfaces, such as implementing a connection between M1 physical coding layer interfaces and M2 physical scrambling layer interfaces by using a timeslot-based interface (in a manner of a time-division interconnect bus or a time-division space-division switching matrix), where both M1 and M2 are positive integers.

Figure 10:
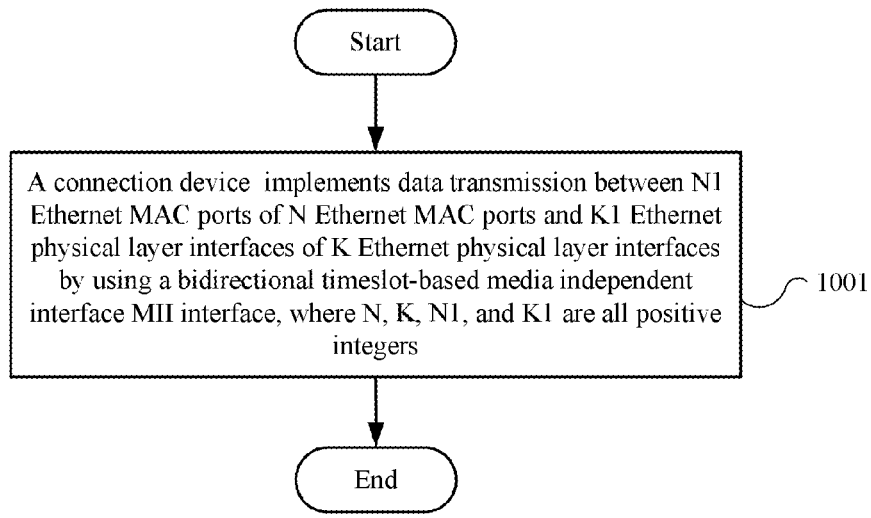
FIG. 10 is a flowchart of a data transmission method according to an embodiment of the present invention.

FIG. 10 is a flowchart of a data transmission method according to an embodiment of the present invention.

1001. A connection device implements data transmission between N1 Ethernet MAC ports of N Ethernet MAC ports and K1 Ethernet physical layer interfaces of K Ethernet physical layer interfaces by using a connection between a timeslot of a first MII interface and a timeslot of a second MII interface, where N, K, N1, and K1 are all positive integers.

In an implementation manner, the connection between the timeslot of the first MII interface and the timeslot of the second MII interface is implemented by the connection device by controlling a time-division interconnect bus in the connection device, where the N Ethernet MAC ports are separately connected to the time-division interconnect bus in the connection device by using the corresponding first MII interfaces, and the K Ethernet physical layer interfaces are separately connected to the time-division interconnect bus in the connection device by using the corresponding second MII interfaces. In another implementation manner, the connection between the timeslot of the first MII interface and the timeslot of the second MII interface is implemented by the connection device by controlling a time-division space-division switching matrix in the connection device, where the N Ethernet MAC ports are separately connected to the time-division space-division switching matrix in the connection device by using the corresponding first MII interfaces, and the K Ethernet physical layer interfaces are separately connected to the time-division space-division switching matrix in the connection device by using the corresponding second MII interfaces.

In this embodiment of the present invention, an MII interface may be a logical interface or a physical electrical interface. The first MII interface and the second MII interface in "a connection between a timeslot of the first MII interface and a timeslot of the second MII interface" described in this embodiment of the present invention are general concepts, which may be a connection between timeslots of all first MII interfaces of the N first MII interfaces and timeslots of some or all second MII interfaces of the K second MII interfaces, or may be a connection between timeslots of some first MII interfaces of the N first MII interfaces and timeslots of some or all second MII interfaces of the K second MII interfaces. This embodiment of the present invention does not set a limitation thereto.

It should be further noted that, in this embodiment of the present invention, a direction of data transmission from an Ethernet physical layer interface to an Ethernet MAC port is called an "uplink direction", and a direction of data transmission from an Ethernet MAC port to an Ethernet physical layer interface is called a "downlink direction". The Ethernet MAC port may be construed as a port of a whole formed by a MAC layer and an RS layer, and a total port rate of the N Ethernet MAC ports is determined by total bandwidth of the K Ethernet physical layer interfaces.

A connection device according to this embodiment of the present invention may control a time-division interconnect bus or a time-division space-division switching matrix to implement data transmission between N1 Ethernet MAC ports of N Ethernet MAC ports and K1 Ethernet physical layer interfaces of K Ethernet physical layer interfaces by using a connection between a timeslot of a first MII interface and a timeslot of a second MII interface. Therefore, by using the connection device, an apparatus can simultaneously support multiple Ethernet MAC ports, provide an Ethernet MAC port with adjustable bandwidth, and select a proper data transmission manner, so as to increase flexibility of a transmission apparatus.

The method in FIG. 10 may be implemented by the transmission apparatus in FIG. 1 to FIG. 9, and therefore, repeated descriptions are properly omitted.

Optionally, as an embodiment, in step 1001, the connection device may implement uplink data transmission in a direction from the K1 Ethernet physical layer interfaces to the N1 Ethernet MAC ports by using the connection between the timeslot of the first MII interface and the timeslot of the second MII interface; or implement downlink data transmission in a direction from the N1 Ethernet MAC ports to the K1 Ethernet physical layer interfaces by using the connection between the timeslot of the first MII interface and the timeslot of the second MII interface.

Optionally, as another embodiment, before step 1001, the connection device may configure and control timeslot division, which specifically is obtaining P timeslots by means of division and allocate some or all timeslots of the P timeslots to the N1 Ethernet MAC ports, where P is a positive integer. In step 1001, transmitted data (uplink data or downlink data) is borne in a corresponding timeslot of the first MII interface and a corresponding timeslot of the second MII interface. One Ethernet MAC port may occupy one or more timeslots, or may occupy no timeslot. Timeslots in the P timeslots may be equal or unequal, and this embodiment of the present invention does not set a limitation thereto. Optionally, an uplink direction or a downlink direction of each timeslot of an MII interface may be corresponding to one or more code blocks (for example, a 64/66b code block). This embodiment of the present invention does not set a limitation on a quantity of the timeslots obtained by means of division, and does not set a limitation on a form of a code block corresponding to a timeslot either. Optionally, the connection device may allocate a timeslot in a static manner, or may allocate a timeslot in a dynamic manner, where the static manner indicates that a timeslot is pre-allocated, and the dynamic manner indicates that timeslot allocation may be dynamically adjusted, for example, a timeslot is allocated according to a service demand or a feature of a transmission link. Optionally, the connection device may further mark the foregoing timeslots obtained by means of division. Timeslots are differentiated according to marks of the timeslots, so as to facilitate management and control, achieve that each data stream is transmitted on a corresponding physical interface, increase data transmission accuracy, and avoid a disorder of data of a same stream. An example of obtaining timeslots by means of division and allocating timeslots is as described above, and details are not described herein again.

Optionally, the connection device may further instruct the N1 MAC ports to transmit valid data in an allocated corresponding timeslot of the first MII interface, or may instruct the N1 MAC ports to skip transmitting data or transmit invalid data. A MAC port may be completely idle when no service demand is required, and the connection device may provide bandwidth of the MAC port to another MAC port for use.

Optionally, the connection device may further control the time-division interconnect bus or the time-division space-division switching matrix to converge downlink data borne in the timeslots of the first MII interfaces, so that the converged downlink data is borne in the timeslot of the second MII interface by using the connection between the timeslot of the first MII interface and the timeslot of the second MII interface, and the converged downlink data borne in the timeslot of the second MII interface is sent to the K1 Ethernet physical layer interface, which specifically is mapping the converged downlink data borne in the timeslot of the second MII interface to J virtual channels of the K1 Ethernet physical layers that are corresponding to the timeslot. The K1 Ethernet physical layers (such as a PCS layer) may be configured to encode the converged downlink data, and transmit encoded downlink data to a physical transmission channel.

Optionally, the K1 Ethernet physical layers receive encoded uplink data from a physical transmission channel, decode the encoded uplink data, and send decoded uplink data to the connection device. The connection device controls the time-division interconnect bus or the time-division space-division switching matrix so that the decoded uplink data is borne in a corresponding timeslot of the second MII interface, which specifically is that the decoded uplink data that is transmitted through the J virtual channels of the K1 Ethernet physical layers is borne in the corresponding timeslot of the second MII interface, the decoded uplink data is borne in the timeslot of the first MII interface by using the connection between the timeslot of the first MII interface and the timeslot of the second MII interface, and the decoded uplink data borne in the timeslot of the first MII interface is sent to the N1 Ethernet MAC ports.

An embodiment of a mapping and a connection between a timeslot and a virtual channel is as described above, and details are not described herein again.

Optionally, the connection device may further disable some or all Ethernet physical layer interfaces of the K Ethernet physical layer interfaces, such as disabling an Ethernet physical layer interface not used to transmit data. In this way, power consumption of the apparatus can be effectively reduced, and a life circle of a device is prolonged, thereby reducing operation and maintenance costs of the apparatus.

In addition, the connection device may further extend a bit width or increase a clock rate for any MAC port of the N Ethernet MAC ports, so that a MAC port capacity with transmission capabilities of multiple physical interfaces is supported, thereby increasing bandwidth. In this way, one Ethernet MAC port may occupy bandwidth of multiple physical interfaces. In should be understood that any manner of extending bandwidth of an Ethernet MAC port falls within the scope of the present invention.

By using the foregoing solution, sharing of a physical interface module and a communication channel can be implemented according to a bandwidth demand of a MAC port on an apparatus, which increases utilization of a physical interface and a transmission channel. For another example, all or some physical layer interfaces may be temporarily disabled to reduce power consumption of the apparatus. In this way, a life cycle of a device may be effectively prolonged, thereby reducing operation and maintenance costs of the apparatus.

Figure 11:
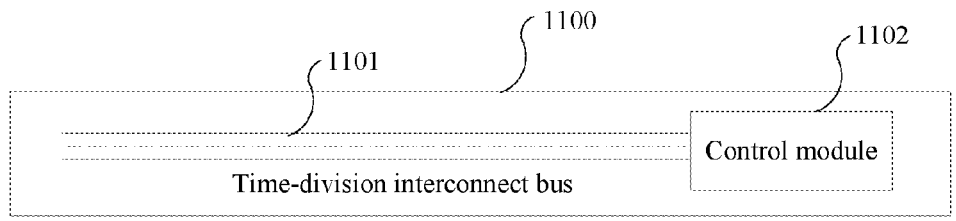
FIG. 11 is a schematic structural diagram of a connection device according to an embodiment of the present invention.

FIG. 11 is a schematic structural diagram of a connection device according to an embodiment of the present invention. A connection device 1100 in FIG. 11 is an example of the connection device 102 and includes a time-division interconnect bus 1101 and a control module 1102.

The control module 1102 is configured to control the time-division interconnect bus 1101 to implement a connection between a timeslot of a first MII interface and a timeslot of a second MII interface by using the time-division interconnect bus.

The connection between the timeslot of the first MII interface and the timeslot of the second MII interface is implemented by the connection device by controlling the time-division interconnect bus in the connection device, where N Ethernet MAC ports are separately connected to the time-division interconnect bus in the connection device by using the corresponding first MII interfaces, and K Ethernet physical layer interfaces are separately connected to the time-division interconnect bus in the connection device by using the corresponding second MII interfaces.

In this embodiment of the present invention, an MII interface may be a logical interface or a physical electrical interface. The first MII interface and the second MII interface in "a connection between a timeslot of the first MII interface and a timeslot of the second MII interface" described in this embodiment of the present invention are general concepts, which may be a connection between timeslots of all first MII interfaces of the N first MII interfaces and timeslots of some or all second MII interfaces of the K second MII interfaces, or may be a connection between timeslots of some first MII interfaces of the N first MII interfaces and timeslots of some or all second MII interfaces of the K second MII interfaces. This embodiment of the present invention does not set a limitation thereto.

It should be further noted that, in this embodiment of the present invention, a direction of data transmission from an Ethernet physical layer interface to an Ethernet MAC port is called an "uplink direction", and a direction of data transmission from an Ethernet MAC port to an Ethernet physical layer interface is called a "downlink direction". The Ethernet MAC port may be construed as a port of a whole formed by a MAC layer and an RS layer, and a total port rate of the N Ethernet MAC ports is determined by total bandwidth of the K Ethernet physical layer interfaces.

A connection device according to this embodiment of the present invention may control a time-division interconnect bus to implement data transmission between N1 Ethernet MAC ports of N Ethernet MAC ports and K1 Ethernet physical layer interfaces of K Ethernet physical layer interfaces by using a connection between a timeslot of a first MII interface and a timeslot of a second MII interface. Therefore, by using the connection device, an apparatus can simultaneously support multiple Ethernet MAC ports, provide an Ethernet MAC port with adjustable bandwidth, and select a proper data transmission manner, so as to increase flexibility of a transmission apparatus.

Preferably, a value of K is 1, that is, the N Ethernet MAC ports share one Ethernet physical layer interface, and the time-division interconnect bus is used to implement a connection between the N Ethernet MAC ports and the one Ethernet physical layer interface. Optionally, the time-division interconnect bus may be a TDM bus.

For specific implementation of the time-division interconnect bus 1101 and the control module 1102 in the connection device 1100, refer to corresponding descriptions of the connection device in the transmission apparatus in FIG. 1, and details are not described herein again.

Figure 12:
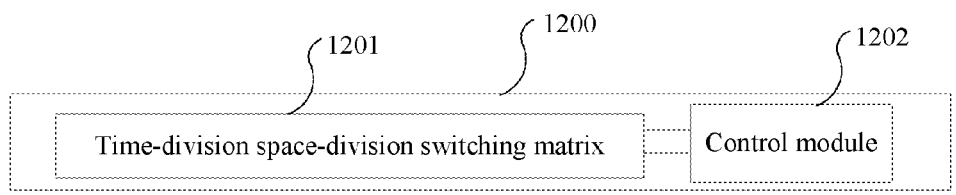
FIG. 12 is a schematic structural diagram of a connection device according to another embodiment of the present invention.

FIG. 12 is a schematic structural diagram of a connection device according to another embodiment of the present invention. A connection device 1200 in FIG. 12 is an example of the connection device 102 and includes a time-division space-division switching matrix 1201 and a control module 1202.

The control module 102 is configured to control the time-division space-division switching matrix 1201 to implement a connection between a timeslot of a first MII interface and a timeslot of a second MII interface.

The connection between the timeslot of the first MII interface and the timeslot of the second MII interface is implemented by the connection device by controlling the time-division space-division switching matrix in the connection device, where N Ethernet MAC ports are separately connected to the time-division space-division switching matrix in the connection device by using the corresponding first MII interfaces, and K Ethernet physical layer interfaces are separately connected to the time-division space-division switching matrix in the connection device by using the corresponding second MII interfaces.

In this embodiment of the present invention, an MII interface may be a logical interface or a physical electrical interface. The first MII interface and the second MII interface in "a connection between a timeslot of the first MII interface and a timeslot of the second MII interface" described in this embodiment of the present invention are general concepts, which may be a connection between timeslots of all first MII interfaces of the N first MII interfaces and timeslots of some or all second MII interfaces of the K second MII interfaces, or may be a connection between timeslots of some first MII interfaces of the N first MII interfaces and timeslots of some or all second MII interfaces of the K second MII interfaces. This embodiment of the present invention does not set a limitation thereto.

It should be further noted that, in this embodiment of the present invention, a direction of data transmission from an Ethernet physical layer interface to an Ethernet MAC port is called an "uplink direction", and a direction of data transmission from an Ethernet MAC port to an Ethernet physical layer interface is called a "downlink direction". The Ethernet MAC port may be construed as a port of a whole formed by a MAC layer and an RS layer, and a total port rate of the N Ethernet MAC ports is determined by total bandwidth of the K Ethernet physical layer interfaces.

A connection device according to this embodiment of the present invention may control a time-division space-division switching matrix to implement data transmission between N1 Ethernet MAC ports of N Ethernet MAC ports and K1 Ethernet physical layer interfaces of K Ethernet physical layer interfaces by using a connection between a timeslot of a first MII interface and a timeslot of a second MII interface. Therefore, by using the connection device, an apparatus can simultaneously support multiple Ethernet MAC ports, provide an Ethernet MAC port with adjustable bandwidth, and select a proper data transmission manner, so as to increase flexibility of a transmission apparatus.

A value of K is greater than or equal to 1, that is, the N Ethernet MAC ports share one or more Ethernet physical layer interfaces, and the time-division space-division switching matrix is used to implement a connection between the N Ethernet MAC ports and the one or more Ethernet physical layer interfaces. Optionally, the time-division space-division switching matrix may be a TDM T-S-T switching matrix, a transformed form thereof, or the like.

For specific implementation of the time-division interconnect bus 1201 and the control module 1202 in the connection device 1200, refer to corresponding descriptions of the connection device in the transmission apparatus in FIG. 1, and details are not described herein again.

Figure 13:
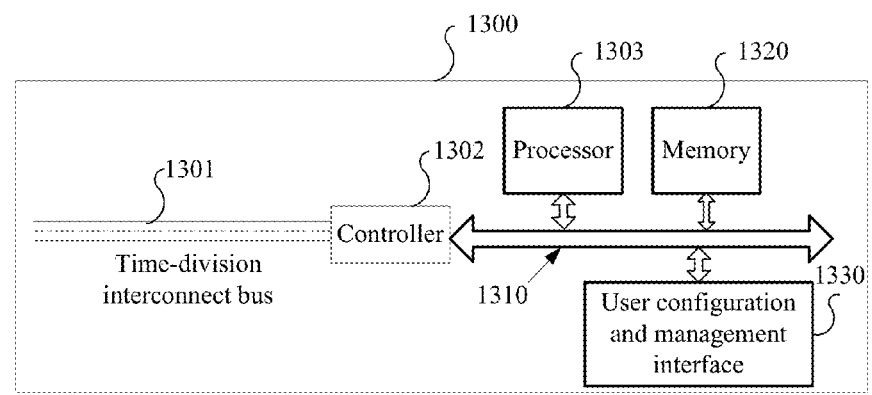
FIG. 13 is a schematic structural diagram of a connection device according to still another embodiment of the present invention.

FIG. 13 is a schematic structural diagram of a connection device according to still another embodiment of the present invention.

A connection device 1300 in FIG. 13 is an example of the connection device 102 and includes a time-division interconnect bus 1301, a controller 1302, a processor 1303, and the like.

The processor 1303 may be an integrated circuit chip with a signal processing capability. In an implementation process, each step of the foregoing method may be completed by an integrated logic circuit in a form of hardware or an instruction in a form of software form that are in the processor 1303. The foregoing processor 1303 may be a general processor, including a central processing unit (Central Processing Unit, CPU), a network processor (Network Processor, NP), and the like; or may be a digital signal processor (Digital Signal Processing, DSP), an application-specific integrated circuit (Application Specific Integrated Circuit, ASIC), a field programmable gate array (Field Programmable Gate Array, FPGA) or another programmable logic device, a discrete gate or a transistor logic device, or a discrete hardware assembly. The processor 1303 may implement or execute each method, step, and logic block diagram disclosed in the embodiments of the present invention. The general processor may be a microprocessor or the processor may also be any conventional processor, or the like. A memory 1320 may include a read-only memory and a random access memory, and provide a control instruction and data to the processor 1303. A part of the memory 1303 may further include a nonvolatile random access memory (NVRAM). The connection device 1300 may further include a user configuration and management interface 1330, another hardware interface, and the like.

The processor 1303, the memory 1320, the user configuration and management interface, and the like are coupled together by a bus system 1310, where besides a data bus, the bus system 1310 further includes a power bus, a control bus, and a status signal bus. However, for clarity of description, all buses in the diagram are marked as the bus system 1310.

The processor 1303 is configured to control the controller 1302 to control the time-division interconnect bus 1301 to implement a connection between a timeslot of a first MII interface and a timeslot of a second MII interface by using the time-division interconnect bus.

The connection between the timeslot of the first MII interface and the timeslot of the second MII interface is implemented by the connection device by controlling the time-division interconnect bus in the connection device, where N Ethernet MAC ports are separately connected to the time-division interconnect bus in the connection device by using the corresponding first MII interfaces, and K Ethernet physical layer interfaces are separately connected to the time-division interconnect bus in the connection device by using the corresponding second MII interfaces.

In this embodiment of the present invention, an MII interface may be a logical interface or a physical electrical interface. The first MII interface and the second MII interface in "a connection between a timeslot of the first MII interface and a timeslot of the second MII interface" described in this embodiment of the present invention are general concepts, which may be a connection between timeslots of all first MII interfaces of the N first MII interfaces and timeslots of some or all second MII interfaces of the K second MII interfaces, or may be a connection between timeslots of some first MII interfaces of the N first MII interfaces and timeslots of some or all second MII interfaces of the K second MII interfaces. This embodiment of the present invention does not set a limitation thereto.

It should be further noted that, in this embodiment of the present invention, a direction of data transmission from an Ethernet physical layer interface to an Ethernet MAC port is called an "uplink direction", and a direction of data transmission from an Ethernet MAC port to an Ethernet physical layer interface is called a "downlink direction". The Ethernet MAC port may be construed as a port of a whole formed by a MAC layer and an RS layer, and a total port rate of the N Ethernet MAC ports is determined by total bandwidth of the K Ethernet physical layer interfaces.

A connection device according to this embodiment of the present invention may control a time-division interconnect bus to implement data transmission between N1 Ethernet MAC ports of N Ethernet MAC ports and K1 Ethernet physical layer interfaces of K Ethernet physical layer interfaces by using a connection between a timeslot of a first MII interface and a timeslot of a second MII interface. Therefore, by using the connection device, an apparatus can simultaneously support multiple Ethernet MAC ports, provide an Ethernet MAC port with adjustable bandwidth, and select a proper data transmission manner, so as to increase flexibility of a transmission apparatus.

Preferably, a value of K is 1, that is, the N Ethernet MAC ports share one Ethernet physical layer interface, and the time-division interconnect bus is used to implement a connection between the N Ethernet MAC ports and the one Ethernet physical layer interface. Optionally, the time-division interconnect bus may be a TDM bus.

For specific implementation of the time-division interconnect bus 1301 and the controller 1302 in the connection device 1300, refer to corresponding descriptions of the connection device in the transmission apparatus in FIG. 1, and details are not described herein again.

Figure 14:
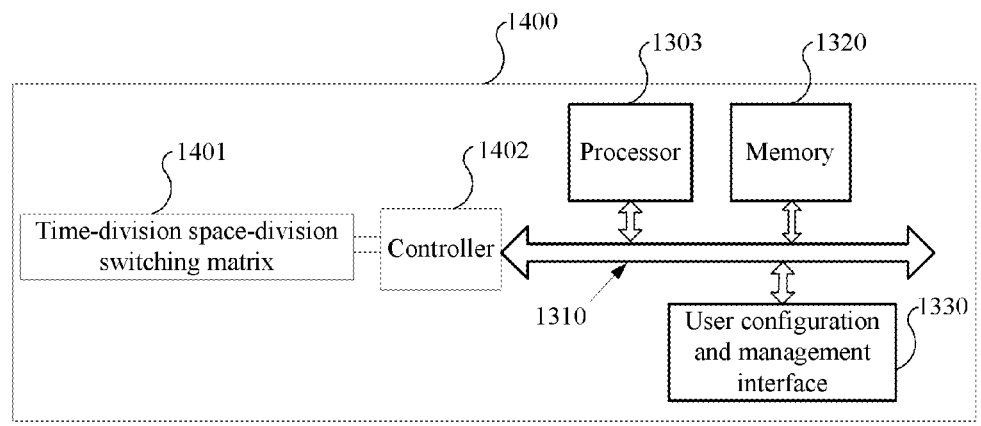
FIG. 14 is a schematic structural diagram of a connection device according to still another embodiment of the present invention.

FIG. 14 is a schematic structural diagram of a connection device according to still another embodiment of the present invention. A connection device 1100 in FIG. 14 is an example of the connection device 102 and includes a time-division space-division switching matrix 1401, a controller 1402, and a processor 1303.

The processor 1303 is configured to control the controller 1402 to control the time-division space-division switching matrix 1401 to implement a connection between a timeslot of a first MII interface and a timeslot of a second MII interface.

The connection between the timeslot of the first MII interface and the timeslot of the second MII interface is implemented by the connection device by controlling the time-division space-division switching matrix in the connection device, where N Ethernet MAC ports are separately connected to the time-division space-division switching matrix in the connection device by using the corresponding first MII interfaces, and K Ethernet physical layer interfaces are separately connected to the time-division space-division switching matrix in the connection device by using the corresponding second MII interfaces.

In this embodiment of the present invention, an MII interface may be a logical interface or a physical electrical interface. The first MII interface and the second MII interface in "a connection between a timeslot of the first MII interface and a timeslot of the second MII interface" described in this embodiment of the present invention are general concepts, which may be a connection between timeslots of all first MII interfaces of the N first MII interfaces and timeslots of some or all second MII interfaces of the K second MII interfaces, or may be a connection between timeslots of some first MII interfaces of the N first MII interfaces and timeslots of some or all second MII interfaces of the K second MII interfaces. This embodiment of the present invention does not set a limitation thereto.

It should be further noted that, in this embodiment of the present invention, a direction of data transmission from an Ethernet physical layer interface to an Ethernet MAC port is called an "uplink direction", and a direction of data transmission from an Ethernet MAC port to an Ethernet physical layer interface is called a "downlink direction". The Ethernet MAC port may be construed as a port of a whole formed by a MAC layer and an RS layer, and a total port rate of the N Ethernet MAC ports is determined by total bandwidth of the K Ethernet physical layer interfaces.

A connection device according to this embodiment of the present invention may control a time-division space-division switching matrix to implement data transmission between N1 Ethernet MAC ports of N Ethernet MAC ports and K1 Ethernet physical layer interfaces of K Ethernet physical layer interfaces by using a connection between a timeslot of a first MII interface and a timeslot of a second MII interface. Therefore, by using the connection device, an apparatus can simultaneously support multiple Ethernet MAC ports, provide an Ethernet MAC port with adjustable bandwidth, and select a proper data transmission manner, so as to increase flexibility of a transmission apparatus.

A value of K is greater than or equal to 1, that is, the N Ethernet MAC ports share one or more Ethernet physical layer interfaces, and the time-division space-division switching matrix is used to implement a connection between the N Ethernet MAC ports and the one or more Ethernet physical layer interfaces. Optionally, the time-division space-division switching matrix may be a TDM T-S-T switching matrix, a transformed form thereof, or the like.

For specific implementation of the time-division interconnect bus 1401 and the controller 1402 in the connection device 1400, refer to corresponding descriptions of the connection device in the transmission apparatus in FIG. 1, and details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, and are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A transmission apparatus, comprising: N Ethernet Medium Access Control MAC ports, wherein each Ethernet MAC port is corresponding to a first interface, K Ethernet physical layer interfaces, wherein each Ethernet physical layer interface is corresponding to a second interface, and a connection device, wherein both N and K are positive integers; wherein
the connection device is configured to control a time-division interconnect bus in the connection device or a time-division space-division switching matrix in the connection device to implement a connection between a timeslot of the first interface and a timeslot of the second interface, wherein
when the connection device is configured to control a time-division interconnect bus in the connection device, the N Ethernet MAC ports are separately connected to the time-division interconnect bus in the connection device by using the corresponding first interfaces, and the K Ethernet physical layer interfaces are separately connected to the time-division interconnect bus in the connection device by using the corresponding second interfaces; and
when the connection device is configured to control a time-division space-division switching matrix in the connection device, the N Ethernet MAC ports are separately connected to the time-division space-division switching matrix in the connection device by using the corresponding first interfaces, and the K Ethernet physical layer interfaces are separately connected to the time-division space-division switching matrix in the connection device by using the corresponding second interfaces.

2. The apparatus according to claim 1, wherein
the connection device is further configured to configure and control timeslot division, and allocate some or all timeslots of P timeslots obtained by means of division to some or all ports of the N Ethernet MAC ports, wherein P is a positive integer.

3. The apparatus according to claim 2, wherein one interface of the K Ethernet physical layer interfaces has J virtual channels, or multiple interfaces of the K Ethernet physical layer interfaces have J virtual channels altogether; and
the connection device is further configured to map some or all timeslots of the P timeslots to the J virtual channels, wherein each virtual channel is used to provide bandwidth by using the second interface, and J is a positive integer.

4. The apparatus according to claim 2, wherein
the connection device is further configured to mark some or all timeslots of the P timeslots.

5. The apparatus according to claim 1, wherein
the connection device is further configured to extend a bit width or increase a clock rate for any MAC port of the N Ethernet MAC ports, so that a MAC port capacity with transmission capabilities of multiple physical interfaces is supported.

6. The apparatus according to claim 1, wherein
the connection device is further configured to implement data transmission between N1 Ethernet MAC ports and K1 Ethernet physical layer interfaces by using the connection between the timeslot of the first interface and the timeslot of the second interface, wherein
the N Ethernet MAC ports comprise the N1 Ethernet MAC ports, wherein N1 is a positive integer and N1≤N; and the K Ethernet physical layer interfaces comprise the K1 Ethernet physical layer interfaces, wherein K1 is a positive integer and K1≤K.

7. The apparatus according to claim 6, wherein
the connection device is further configured to implement uplink data transmission in a direction from the K1 Ethernet physical layer interfaces to the N1 Ethernet MAC ports by using the connection between the timeslot of the first interface and the timeslot of the second interface; or
the connection device is further configured to implement downlink data transmission in a direction from the N1 Ethernet MAC ports to the K1 Ethernet physical layer interfaces by using the connection between the timeslot of the first interface and the timeslot of the second interface.

8. The apparatus according to claim 7, wherein
when the connection device is configured to control a time-division interconnect bus in the connection device, the connection device is further configured to control the time-division interconnect bus to converge the downlink data borne in the timeslots of the first interfaces, so that the converged downlink data is borne in the timeslot of the second interface by using the connection between the timeslot of the first interface and the timeslot of the second interface, and the converged downlink data borne in the timeslot of the second interface is sent to the K1 Ethernet physical layer interfaces; and
the K1 Ethernet physical layer interfaces are configured to encode the converged downlink data and transmit encoded downlink data to a physical transmission channel, and
when the connection device is configured to control a time-division space-division switching matrix in the connection device, the connection device is further configured to control the time-division space-division switching matrix to converge the downlink data borne in the timeslots of the first interfaces, so that the converged downlink data is borne in the timeslot of the second interface by using the connection between the timeslot of the first interface and the timeslot of the second interface, and the converged downlink data borne in the timeslot of the second interface is sent to the K1 Ethernet physical layer interfaces; and the K1 Ethernet physical layer interfaces are configured to encode the converged downlink data and transmit encoded downlink data to a physical transmission channel.

9. The apparatus according to claim 7, wherein the K1 Ethernet physical layer interfaces are configured to receive encoded uplink data from a physical transmission channel, decode the encoded uplink data, and send decoded uplink data to the connection device; and when the connection device is configured to control a time-division interconnect bus in the connection device, the connection device is further configured to control the time-division interconnect bus so that the decoded uplink data is borne in a corresponding timeslot of the second interface, the decoded uplink data is borne in the timeslot of the first interface by using the connection between the timeslot of the first interface and the timeslot of the second interface, and the decoded uplink data borne in the timeslot of the first interface is sent to the N1 Ethernet MAC ports, and when the connection device is configured to control a time-division space-division switching matrix in the connection device, the connection device is further configured to control the time-division space-division switching matrix so that the decoded uplink data is borne in a corresponding timeslot of the second interface, the decoded uplink data is borne in the timeslot of the first interface by using the connection between the timeslot of the first interface and the timeslot of the second interface, and the decoded uplink data borne in the timeslot of the first interface is sent to the N1 Ethernet MAC ports.

10. The apparatus according to claim 1, wherein the connection device is further configured to disable some or all Ethernet physical layer interfaces of the K Ethernet physical layer interfaces.

11. A data transmission method, comprising:

implementing, by a connection device, data transmission between N1 Ethernet MAC ports of N Ethernet MAC ports and K1 Ethernet physical layer interfaces of K Ethernet physical layer interfaces by using a connection between a timeslot of a first interface and a timeslot of a second interface, wherein the connection between the timeslot of the first interface and the timeslot of the second interface is implemented by the connection device by controlling a time-division interconnect bus in the connection device or a time-division space-division switching matrix in the connection device, N and N1 are positive integers and N1≤N, and both K and K1 are positive integers and K1≤K, wherein when the connection device controls a time-division interconnect bus in the connection device, the N Ethernet MAC ports are separately connected to the time-division interconnect bus in the connection device by using the corresponding first interfaces, and the K Ethernet physical layer interfaces are separately connected to the time-division interconnect bus in the connection device by using the corresponding second interfaces; and when the connection device controls a time-division space-division switching matrix in the connection device, the N Ethernet MAC ports are separately connected to the time-division space-division switching matrix in the connection device by using the corresponding first interfaces, and the K Ethernet physical layer interfaces are separately connected to the time-division space-division switching matrix in the connection device by using the corresponding second interfaces.

12. The method according to claim 11, wherein the implementing, by a connection device, data transmission between N1 Ethernet MAC ports of N Ethernet MAC ports and K1 Ethernet physical layer interfaces of K Ethernet physical layer interfaces by using a connection between a timeslot of a first interface and a timeslot of a second interface comprises:

implementing, by the connection device, uplink data transmission in a direction from the K1 Ethernet physical layer interfaces to the N1 Ethernet MAC ports by using the connection between the timeslot of the first interface and the timeslot of the second interface; or implementing, by the connection device, downlink data transmission in a direction from the N1 Ethernet MAC ports to the K1 Ethernet physical layer interfaces by using the connection between the timeslot of the first interface and the timeslot of the second interface.

13. The method according to claim 11, wherein uplink data and/or downlink data is borne in some or all timeslots of P timeslots obtained by means of division, wherein P is a positive integer.

14. The method according to claim 13, wherein the method further comprises:

when the connection device controls a time-division interconnect bus in the connection device, controlling, by the connection device, the time-division interconnect bus to converge the downlink data borne in the timeslots of the first interfaces, so that the converged downlink data is borne in the timeslot of the second interface by using the connection between the timeslot of the first interface and the timeslot of the second interface, and the converged downlink data borne in the timeslot of the second interface is sent to the K1 Ethernet physical layer interfaces; and encoding, by the K1 Ethernet physical layer interfaces, the converged downlink data, and transmitting encoded downlink data to a physical transmission channel, and when the connection device controls a time-division space-division switching matrix in the connection device, controlling, by the connection device, the time-division space-division switching matrix to converge the downlink data borne in the timeslots of the first interfaces, so that the converged downlink data is borne in the timeslot of the second interface by using the connection between the timeslot of the first interface and the timeslot of the second interface, and the converged downlink data borne in the timeslot of the second interface is sent to the K1 Ethernet physical layer interfaces; and encoding, by the K1 Ethernet physical layer interfaces, the converged downlink data, and transmitting encoded downlink data to a physical transmission channel.

15. The method according to claim 14, wherein that the converged downlink data borne in the timeslot of the second interface is sent to the K1 Ethernet physical layer interfaces comprises:

mapping the converged downlink data to J virtual channels that are of the K1 Ethernet physical layers and corresponding to the timeslot, wherein J is a positive integer.

16. The method according to claim 13, wherein the method further comprises:

receiving, by the K1 Ethernet physical layer interfaces, encoded uplink data from a physical transmission channel, decoding the encoded uplink data, and bearing and sending decoded uplink data to the connection device; and when the connection device controls a time-division interconnect bus in the connection device, controlling, by the connection device, the time-division interconnect bus so that the decoded uplink data is borne in a corresponding timeslot of the second interface, the decoded uplink data is borne in the timeslot of the first interface by using the connection between the timeslot of the first interface and the timeslot of the second interface, and the decoded uplink data borne in the timeslot of the first interface is sent to the N1 Ethernet MAC ports, and when the connection device controls a time-division space-division switching matrix in the connection device, controlling, by the connection device, the time-division space-division switching matrix so that the decoded uplink data is borne in a corresponding timeslot of the second interface, the decoded uplink data is borne in the timeslot of the first interface by using the connection between the timeslot of the first interface and the timeslot of the second interface, and the decoded uplink data borne in the timeslot of the first interface is sent to the N1 Ethernet MAC ports.

17. The method according to claim 16, wherein that the decoded uplink data is borne in a corresponding timeslot of the second interface comprises that:

the decoded uplink data that is transmitted through J virtual channels of the K1 Ethernet physical layers is borne in the corresponding timeslot of the second interface.

18. A connection device, comprising:

a control module and a time-division interconnect bus, wherein the control module is configured to control the time-division interconnect bus to implement a connection between a timeslot of a first interface and a timeslot of a second interface, wherein the connection between the timeslot of the first interface and the timeslot of the second interface is implemented by the connection device by controlling the time-division interconnect bus in the connection device; and N Ethernet MAC ports are separately connected to the time-division interconnect bus in the connection device by using the corresponding first interfaces, and K Ethernet physical layer interfaces are separately connected to the time-division interconnect bus in the connection device by using the corresponding second interfaces.

19. A connection device, comprising:

a control module and a time-division space-division switching matrix, wherein the control module is configured to control the time-division space-division switching matrix to implement a connection between a timeslot of the first interface and a timeslot of the second interface, wherein the connection between the timeslot of the first interface and the timeslot of the second interface is implemented by the connection device by controlling the time-division space-division switching matrix in the connection device; and the N Ethernet MAC ports are separately connected to the time-division space-division switching matrix in the connection device by using the corresponding first interfaces, and the K Ethernet physical layer interfaces are separately connected to the time-division space-division switching matrix in the connection device by using the corresponding second interfaces.

\* \* \* \* \*